United States Patent
Akkarakaran et al.

(10) Patent No.: US 12,150,184 B2
(45) Date of Patent: *Nov. 19, 2024

(54) ARCHITECTURE FOR INTEGRATED ACCESS AND BACKHAUL WITH SIDELINK

(71) Applicant: QUALCOMM Incorporated, San Diego, CA (US)

(72) Inventors: Sony Akkarakaran, Poway, CA (US); Navid Abedini, Basking Ridge, NJ (US); Naeem Akl, Somerville, NJ (US); Tao Luo, San Diego, CA (US); Junyi Li, Fairless Hills, PA (US)

(*) Notice: Subject to any disclaimer, the term of this patent is extended or adjusted under 35 U.S.C. 154(b) by 476 days.

This patent is subject to a terminal disclaimer.

(21) Appl. No.: 17/385,160

(22) Filed: Jul. 26, 2021

(65) Prior Publication Data

US 2023/0027099 A1  Jan. 26, 2023

(51) Int. Cl.
*H04W 76/10* (2018.01)
*H04W 8/24* (2009.01)
*H04W 12/06* (2021.01)
*H04W 88/14* (2009.01)

(52) U.S. Cl.
CPC ............ *H04W 76/10* (2018.02); *H04W 8/24* (2013.01); *H04W 12/06* (2013.01); *H04W 88/14* (2013.01)

(58) Field of Classification Search
CPC ....... H04W 76/10; H04W 8/24; H04W 12/06; H04W 88/14; H04W 12/08; H04W 24/02; H04W 92/045
See application file for complete search history.

(56) References Cited

U.S. PATENT DOCUMENTS

2020/0374953 A1* 11/2020 Majmundar .......... H04L 5/0092
2023/0022723 A1  1/2023 Akkarakaran et al.
2023/0025046 A1  1/2023 Akkarakaran et al.

FOREIGN PATENT DOCUMENTS

WO  WO-2022160108 A1 * 8/2022

OTHER PUBLICATIONS

Sony: "Overview of LAyer-2 and Layer-3 Sidelink Relay Mechanisms", 3GPP TSG-RAN WG2 Meeting #111 electronic, R2-2007191, Section 2.1-2.2 and 2.4 p. 2. (Year: 2020).*
International Search Report and Written Opinion—PCT/US2022/037468—ISA/EPO—Nov. 23, 2022.

(Continued)

*Primary Examiner* — Kashif Siddiqui

(57) ABSTRACT

Methods, systems, and devices for wireless communications are described. The described techniques provide for first integrated access and backhaul (IAB) node establishing a signaling connection with an IAB donor node and a sidelink connection with a second IAB node or a user equipment (UE). The first IAB node may include a mobile termination unit and a distributed unit and may support sidelink communications. In some cases, the first IAB node may report an indication of sidelink communications support, receive an indication of sidelink communication authorization, and receive sidelink configuration information. The first IAB node may transmit one or more data messages to the IAB donor on the signaling connection and transmit one or more data messages to the second IAB node or the UE via the sidelink connection.

29 Claims, 12 Drawing Sheets

(56) References Cited

OTHER PUBLICATIONS

Qualcomm Incorporated (Mediator): "Rel-17 IAB Email Discussion—Report", 3GPP TSG RAN meeting #86, RP-193094, 3rd Generation Partnership Project, Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 8, 2019, 39 Pages, XP051838727, p. 13-p. 14, line "OMESH", p. 34.

Sony: "Overview of Layer-2 and Layer-3 Sidelink Relay Mechanisms", 3GPP TSG-RAN WG2 Meeting #111 electronic, R2-2007181, 3rd Generation Partnership Project, Mobile Competence Centre, 650, Route Des Lucioles, F-06921 Sophia-Antipolis Cedex, France, vol. RAN WG2, No. electronic, Aug. 17, 2020-Aug. 28, 2020, Aug. 6, 2020, 6 Pages, XP051910931, Paragraphs, Section 2.1, 2.2, 2.4, p. 2.

\* cited by examiner

ARCHITECTURE FOR INTEGRATED ACCESS AND BACKHAUL WITH SIDELINK

FIELD OF TECHNOLOGY

The following relates to wireless communications, including architecture for integrated access and backhaul with sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems (e.g., 5G new radio (NR) systems), infrastructure and spectral resources for NR access may additionally support wireless backhaul link capabilities in supplement to wireline backhaul connections, providing an integrated access and backhaul (IAB) network architecture. One or more base stations may include centralized units (CUs) and distributed units (DUs) and may be referred to as donor base stations. One or more DUs associated with a donor base station may be partially controlled by CUs associated with the donor base station. The one or more donor base stations (e.g., IAB donors) may be in communication with one or more additional base stations (e.g., IAB nodes) via supported access and backhaul links. IAB nodes may support mobile terminal (MT) functionality controlled and/or scheduled by DUs of a coupled IAB donor. In addition, the IAB nodes may include DUs that support communication links with additional entities (e.g., IAB nodes, UEs, etc.) within the relay chain or configuration of the access network (e.g., downstream). In some examples, the IAB of the IAB network may serve UEs that support sidelink communications.

SUMMARY

The described techniques relate to improved methods, systems, devices, and apparatuses that support architecture for integrated access and backhaul with sidelink. Generally, the described techniques provide for first integrated access and backhaul (IAB) node establishing a signaling connection with an IAB donor node and a sidelink connection with a second IAB node or a user equipment (UE). The first IAB node may include a mobile termination unit and a distributed unit and may support sidelink communications. In some cases, the first IAB node may report an indication of sidelink communications support, receive an indication of sidelink communication authorization, and receive sidelink configuration information. The first IAB node may transmit one or more data messages to the IAB donor on the signaling connection and transmit one or more data messages to the second IAB node or the UE via the sidelink connection.

A method for wireless communication at a first integrated access and backhaul (IAB) node is described. The method may include establishing, by the first IAB node, a signaling connection with an IAB donor node and a sidelink connection with a second IAB node or a user equipment (UE), where the first IAB node includes a mobile termination unit and a distributed unit, and supports sidelink communications, transmitting a first one or more data messages to the IAB donor node via the established signaling connection, and transmitting a second one or more data messages to the second IAB node or the UE via the established sidelink connection.

An apparatus for wireless communication at a first integrated access and backhaul (IAB) node is described. The apparatus may include a processor, memory coupled with the processor, and instructions stored in the memory. The instructions may be executable by the processor to cause the apparatus to establish, by the first IAB node, a signaling connection with an IAB donor node and a sidelink connection with a second IAB node or a UE, where the first IAB node includes a mobile termination unit and a distributed unit, and supports sidelink communications, transmit a first one or more data messages to the IAB donor node via the established signaling connection, and transmit a second one or more data messages to the second IAB node or the UE via the established sidelink connection.

Another apparatus for wireless communication at a first integrated access and backhaul (IAB) node is described. The apparatus may include means for establishing, by the first IAB node, a signaling connection with an IAB donor node and a sidelink connection with a second IAB node or a UE, where the first IAB node includes a mobile termination unit and a distributed unit, and supports sidelink communications, means for transmitting a first one or more data messages to the IAB donor node via the established signaling connection, and means for transmitting a second one or more data messages to the second IAB node or the UE via the established sidelink connection.

A non-transitory computer-readable medium storing code for wireless communication at a first integrated access and backhaul (IAB) node is described. The code may include instructions executable by a processor to establish, by the first IAB node, a signaling connection with an IAB donor node and a sidelink connection with a second IAB node or a UE, where the first IAB node includes a mobile termination unit and a distributed unit, and supports sidelink communications, transmit a first one or more data messages to the IAB donor node via the established signaling connection, and transmit a second one or more data messages to the second IAB node or the UE via the established sidelink connection.

Some examples of the method, apparatuses, and non-transitory computer-readable medium described herein may further include operations, features, means, or instructions for transmitting, by the first IAB node, an indication that the first IAB node supports the sidelink communications, where the sidelink connection may be established based on the transmitted indication.

In some examples of the method, apparatuses, and non-transitory computer-readable medium described herein, transmitting the indication may include operations, features, means, or instructions for transmitting a sidelink capability message, where the sidelink capability message indicates that the first IAB node supports the sidelink communications in a control plane, that the first IAB node supports the sidelink communications in a user plane, an upper limit on a quantity of sidelink connections supportable by the first IAB node, or a combination thereof.

In some examples of the method, apparatuses, and non-transitory computer-readable medium described herein, the sidelink capability message indicated a sidelink capability per sidelink peer.

In some examples of the method, apparatuses, and non-transitory computer-readable medium described herein, the transmitting the indication may include operations, features, means, or instructions for transmitting the indication that specifies that the first IAB node supports the sidelink communications in conjunction with an indication the first IAB node supports IAB node communications.

In some examples of the method, apparatuses, and non-transitory computer-readable medium described herein, the transmitting the indication may include operations, features, means, or instructions for transmitting the indication on the signaling connection with the IAB donor node, or on a separate connection with the IAB donor node, or on a separate connection with a base station separate from the IAB donor node.

In some examples of the method, apparatuses, and non-transitory computer-readable medium described herein, the transmitting the indication may include operations, features, means, or instructions for broadcasting the indication that the first IAB node supports the sidelink communications.

In some examples of the method, apparatuses, and non-transitory computer-readable medium described herein, broadcasting the indication may include operations, features, means, or instructions for broadcasting, by the distributed unit of the first IAB node, system information including the indication, or, broadcasting, by the mobile termination unit or a sidelink functionality of the first IAB node, a discovery signal including the indication, or, and a combination thereof.

Some examples of the method, apparatuses, and non-transitory computer-readable medium described herein may further include operations, features, means, or instructions for receiving, from a core network, an indication that specifies that the first IAB node may be authorized to perform the sidelink communications, where the sidelink connection may be established based on the received indication.

In some examples of the method, apparatuses, and non-transitory computer-readable medium described herein, receiving the indication may include operations, features, means, or instructions for receiving a sidelink configuration that indicates that the first IAB node may be authorized to perform sidelink communications in a control plane, that the first IAB node may be authorized to perform sidelink communications in a user plane, an upper limit on a quantity of sidelink connections that the first IAB node may be authorized to establish, or a combination thereof.

In some examples of the method, apparatuses, and non-transitory computer-readable medium described herein, the sidelink configuration may be indicated per sidelink peer.

In some examples of the method, apparatuses, and non-transitory computer-readable medium described herein, receiving the indication may include operations, features, means, or instructions for receiving the indication in conjunction with an indication that the first IAB node may be authorized to perform IAB communications.

In some examples of the method, apparatuses, and non-transitory computer-readable medium described herein, receiving the indication may include operations, features, means, or instructions for receiving the indication on the signaling connection with the IAB donor node, or on a separate connection with the IAB donor node, or on a separate connection with a base station separate from the IAB donor node.

Some examples of the method, apparatuses, and non-transitory computer-readable medium described herein may further include operations, features, means, or instructions for receiving, from a central unit of the IAB donor node, a sidelink configuration that the first IAB node may be to use to establish the sidelink connection with the second IAB node or the UE.

In some examples of the method, apparatuses, and non-transitory computer-readable medium described herein, establishing the signaling connection may include operations, features, means, or instructions for establishing, by the mobile termination unit of the first IAB node, a radio resources control connection with a donor unit of the IAB donor node, establishing, by the distributed unit of the first IAB node, an F1 connection with a central unit of the IAB donor node, or, and any combination thereof.

In some examples of the method, apparatuses, and non-transitory computer-readable medium described herein, establishing the signaling connection may include operations, features, means, or instructions for establishing the signaling connection as a second signaling connection to support the sidelink communications for the first IAB node separate from a first signaling connection to support IAB functionality for the first IAB node.

Some examples of the method, apparatuses, and non-transitory computer-readable medium described herein may further include operations, features, means, or instructions for transmitting an indication that the first signaling connection and the second signaling connection correspond to the first IAB node.

Some examples of the method, apparatuses, and non-transitory computer-readable medium described herein may further include operations, features, means, or instructions for transmitting, to the IAB donor node via the signaling connection, a duplexing constraint associated with communications via the mobile termination unit, the distributed unit, and the sidelink connection for the first IAB node.

Some examples of the method, apparatuses, and non-transitory computer-readable medium described herein may further include operations, features, means, or instructions for receiving, from a third IAB node, an indication that the third IAB node supports the sidelink communications and performing parent cell selection based on the indication received from the third IAB node.

Some examples of the method, apparatuses, and non-transitory computer-readable medium described herein may further include operations, features, means, or instructions for transmitting an indication that the first IAB node supports the sidelink communications, receiving, based at least in part in response to transmitting the indication, at least one configuration for communicating one or more synchronization signal blocks (SSBs) to facilitate discovery of the first IAB node, one or more second IAB nodes, or one or more UEs, and communicating the one or more SSBs based on the at least one configuration, where the sidelink connection may be established based at least in part in response to communicating the one or more SSBs.

In some examples of the method, apparatuses, and non-transitory computer-readable medium described herein, the first IAB node includes one or more sidelink functions to support the sidelink communications and the one or more sidelink functions may be separate from one or more distributed units of the first IAB node, one or more mobile termination units of the first IAB node, or both.

In some examples of the method, apparatuses, and non-transitory computer-readable medium described herein, the first IAB node includes one or more sidelink functions to support the sidelink communications and the one or more sidelink functions may be collocated with the one or more donor units, the one or more mobile termination units, or both.

In some examples of the method, apparatuses, and non-transitory computer-readable medium described herein, the one or more sidelink functions may be integrated with the one or donor units, the one or more mobile termination units, or both.

A method for wireless communication at an integrated access and backhaul (IAB) donor node is described. The method may include receiving from a second IAB node, an indication that the second IAB node supports sidelink communications, transmitting, to a core network and based on the received indication that the second IAB node supports sidelink communications, a request for authorization for the second IAB node to perform the sidelink communications, receiving, based at least in part in response to transmitting the request, an indication of the authorization to perform the sidelink communications, and transmitting, to the second IAB node, a sidelink configuration that the second IAB node is to use to establish a sidelink connection with a third IAB node or a UE.

An apparatus for wireless communication at an integrated access and backhaul (IAB) donor node is described. The apparatus may include a processor, memory coupled with the processor, and instructions stored in the memory. The instructions may be executable by the processor to cause the apparatus to receive from a second IAB node, an indication that the second IAB node supports sidelink communications, transmit, to a core network and based on the received indication that the second IAB node supports sidelink communications, a request for authorization for the second IAB node to perform the sidelink communications, receive, based at least in part in response to transmitting the request, an indication of the authorization to perform the sidelink communications, and transmit, to the second IAB node, a sidelink configuration that the second IAB node is to use to establish a sidelink connection with a third IAB node or a UE.

Another apparatus for wireless communication at an integrated access and backhaul (IAB) donor node is described. The apparatus may include means for receiving from a second IAB node, an indication that the second IAB node supports sidelink communications, means for transmitting, to a core network and based on the received indication that the second IAB node supports sidelink communications, a request for authorization for the second IAB node to perform the sidelink communications, means for receiving, based at least in part in response to transmitting the request, an indication of the authorization to perform the sidelink communications, and means for transmitting, to the second IAB node, a sidelink configuration that the second IAB node is to use to establish a sidelink connection with a third IAB node or a UE.

A non-transitory computer-readable medium storing code for wireless communication at an integrated access and backhaul (IAB) donor node is described. The code may include instructions executable by a processor to receive from a second IAB node, an indication that the second IAB node supports sidelink communications, transmit, to a core network and based on the received indication that the second IAB node supports sidelink communications, a request for authorization for the second IAB node to perform the sidelink communications, receive, based at least in part in response to transmitting the request, an indication of the authorization to perform the sidelink communications, and transmit, to the second IAB node, a sidelink configuration that the second IAB node is to use to establish a sidelink connection with a third IAB node or a UE.

In some examples of the method, apparatuses, and non-transitory computer-readable medium described herein, receiving the indication may include operations, features, means, or instructions for receiving a sidelink capability message, where the sidelink capability message indicates that the second IAB node supports the sidelink communications in a control plane, that the second IAB node supports the sidelink communications in a user plane, an upper limit on a quantity of sidelink connections supportable by the first IAB node, or a combination thereof.

In some examples of the method, apparatuses, and non-transitory computer-readable medium described herein, transmitting the sidelink configuration may include operations, features, means, or instructions for transmitting, to the second IAB node, the sidelink configuration that indicates that the second IAB node may be authorized to perform sidelink communications in a control plane, that the second IAB node may be authorized to perform sidelink communications in a user plane, an upper limit on a quantity of sidelink connections that the second IAB node may be authorized to establish, or a combination thereof.

Some examples of the method, apparatuses, and non-transitory computer-readable medium described herein may further include operations, features, means, or instructions for selecting a management entity at the core network based on receiving the indication.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

The described techniques provide for architectures and signaling to support sidelink communications between nodes of a network. The network may include one or more connected base stations and user equipments (UEs) supporting multiple communication links within a relay chain. A core network may be associated with one or more access networks (ANs). In networks employing distributed node techniques, each AN may include a central unit (CU) (e.g., associated with a donor base station) and one or more distributed units (DUs) (e.g., also associated with the donor base station) for scheduling communications with mobile terminals (MTs) (e.g., associated with an intermediary base station) or with UEs of the network. A network node that is configured with a DU and MT to support communications between an IAB donor, other IAB nodes, and UEs may be referred to as an IAB node. According to techniques and architectures described herein, an IAB node may be configured with sidelink functionality to support sidelink communications.

A sidelink capable IAB node may establish a signaling connection with an IAB donor and a sidelink connection with a sidelink peer. The sidelink peer may be an example of another IAB node or a UE. The signaling connection with the IAB donor may be an example of an F1 connection between the DU of the IAB node and the CU of the IAB donor or an RRC connection between the MT of the IAB node and the DU of the IAB donor. The IAB node may communicate one or more data messages over the signaling connection and one or more data messages over the sidelink connection. In some cases, the IAB node may transmit a sidelink capability message that indicates that the IAB node supports sidelink communications. Further, the sidelink connection may be established in accordance with receipt of a sidelink authorization indication, sidelink configuration information, or both. These techniques may be applicable to various architectures for IAB nodes that are configured to support sidelink communications. These and other implementations are described further herein with reference to the figures.

Aspects of the disclosure are initially described in the context of wireless communications systems. Aspects of the disclosure are further described with a wireless communications system illustrating various connections in an IAB network with sidelink functionality, IAB nodes with sidelink functionality architecture, and a process flow diagram. Aspects of the disclosure are further illustrated by and described with reference to apparatus diagrams, system diagrams, and flowcharts that relate to architecture for integrated access and backhaul with sidelink.

Figure 1:
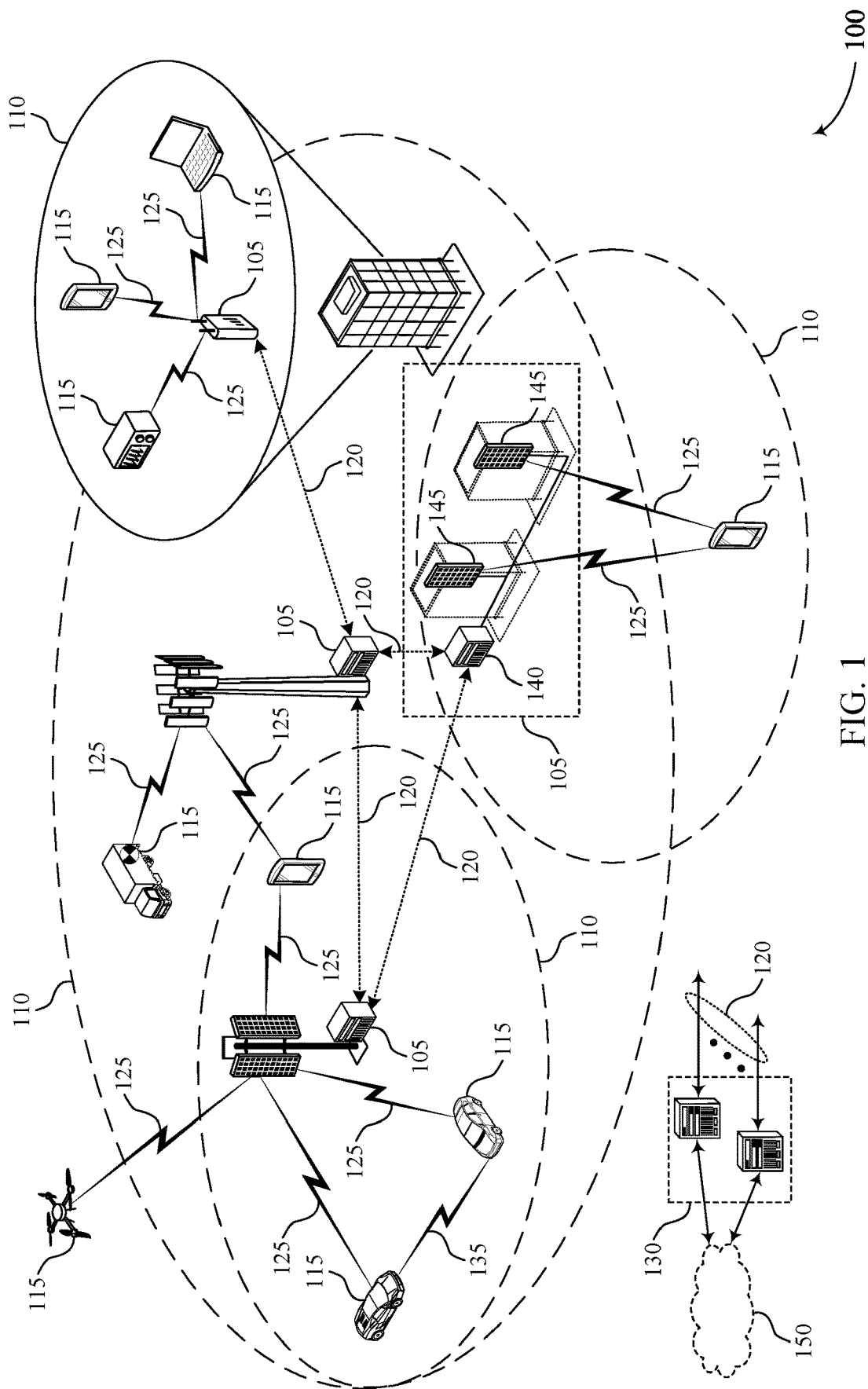
FIG. 1 illustrates an example of a wireless communications system that supports architecture for integrated access and backhaul with sidelink in accordance with aspects of the present disclosure.

FIG. 1 illustrates an example of a wireless communications system 100 that supports architecture for integrated access and backhaul with sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100, one or more base stations 105 may include CUs and DUs, where one or more DUs associated with a base station 105 may be partially controlled by a CU associated with the respective base station 105. The base station CUs may be a component of a database, data center, or the core network 130 (e.g., a 5G NR core network (5GC)). In some examples, a base station CU (e.g., a relay base station 105) may communicate with a one or more DUs supported by antecedent (e.g., parent) base stations 105 via a backhaul link (e.g., a wireline backhaul or a wireless backhaul). As another example, in IAB networks, a base station CU (e.g., a donor base station 105) may communicate with the core network 130 (e.g., the NGC) via a backhaul link (e.g., a wireline backhaul or wireless backhaul). The donor base station 105 may be referred to, for example in an IAB network, as an IAB donor and may be in communication with one or more IAB nodes (e.g., one or more additional base stations 105) operating as base station DUs relative to the IAB donor and one or more UEs. For example, an IAB network may include a chain of wireless devices (e.g., starting with the donor base station 105 (a RAN node that terminates an interface with the core network) and ending with a UE 115, with any number of IAB nodes in between). IAB nodes may support mobile terminal (MT) functionality (which may also be referred to as UE function (UE-F)) controlled and scheduled by an IAB donor, or another IAB node, as its parent node as well as DU functionality (which may also be referred to as an access node function (AN-F)) relative to additional entities (e.g., IAB nodes, UEs, etc.) within the relay chain or configuration of the access network (e.g., downstream). These relay mechanisms may forward traffic along to the additional entities, extend the range of wireless access for one or more base stations, enhance the density of backhaul capability within serving cells, etc.

The wireless communications systems 100 may also support IAB nodes that configured to support sidelink communications. As IAB nodes may serve UEs 115 that may also be configured to support sidelink communication, the IAB nodes that support sidelink communications may be used to increase network communication throughput, increase reliability, among other benefits. For example, some sidelink communication systems may be implemented in high UE mobility scenarios. These systems may be used to support IAB relaying where one or more IAB nodes, one or more UEs, or a combination may operate in high mobility environments. Thus, the sidelink communications may be used rather than, or in addition to, Uu interface communications or F1 communications.

An IAB node may be configured to establish at least one signaling connection with an IAB donor and at least one sidelink connection with a sidelink peer. The signaling connection may be an example of an F1 connection between a DU of an IAB node and the CU of the IAB donor or an example of an RRC connection between an MT of the IAB node and the DU of the IAB donor. In some examples, the IAB node may transmit a sidelink capability message indicating the IAB node's support of sidelink communications. In some cases, the capability message indicates various sidelink configurations that are supported by the IAB node. The IAB node may establish the sidelink connection in response to receipt of authorization from the IAB donor, the central unit, the core network, or a combination thereof. The IAB node may also receive configuration information that the IAB node is to use for establishing the sidelink connection. These and other features described herein may be applicable to various IAB node architectures, where the IAB node includes sidelink functionality. For example, the sidelink functionality may be collocated or non-collocated with the MT, DU, or both of the IAB node, and the sidelink functionality may be integrated with the MT, DU, or both or separate from the MT or DU.

Figure 2:
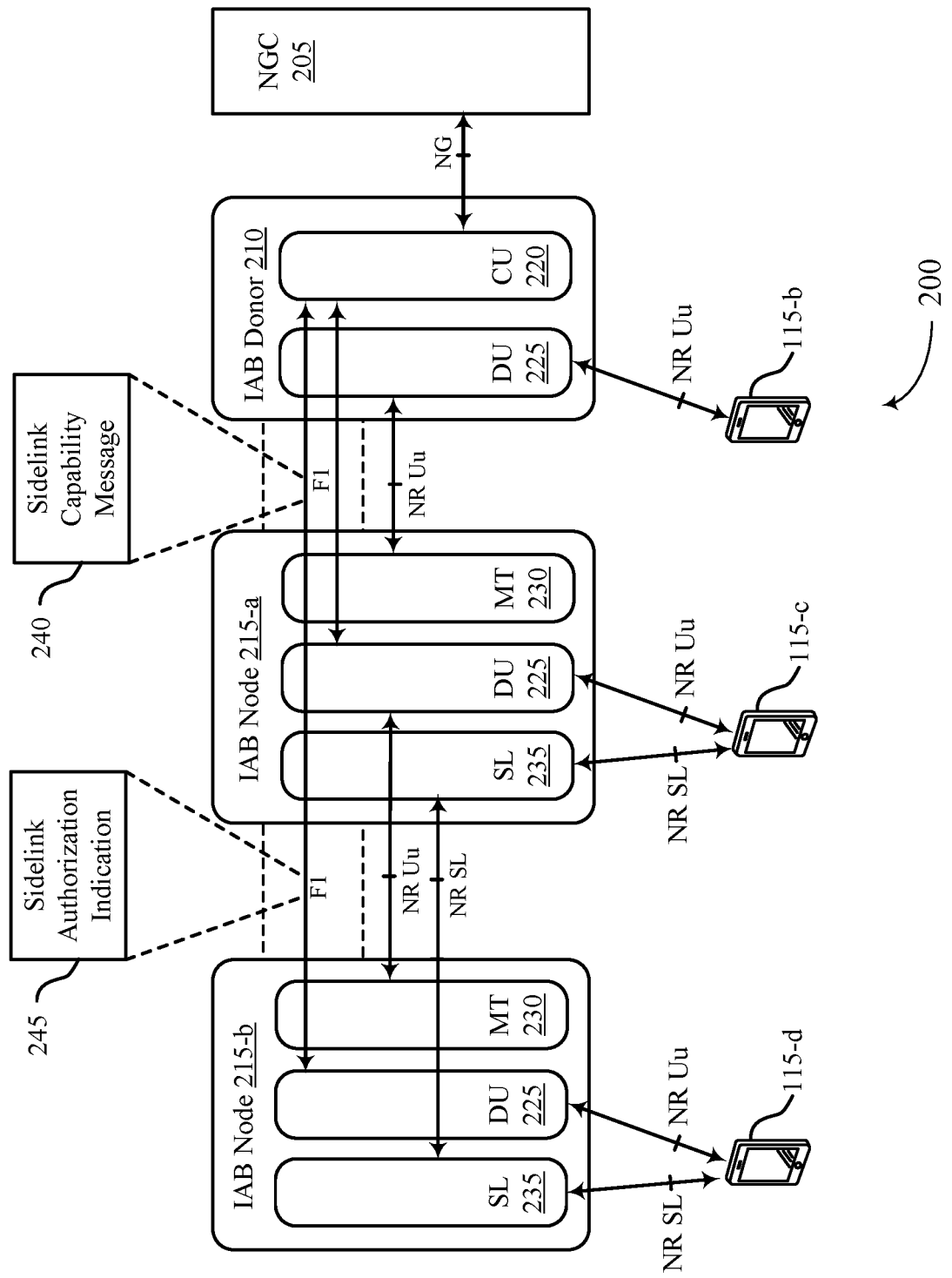
FIG. 2 illustrates an example of a wireless communications system that supports architecture for integrated access and backhaul with sidelink in accordance with aspects of the present disclosure.

FIG. 2 illustrates an example of a wireless communications system 200 that supports architecture for integrated access and backhaul with sidelink in accordance with aspects of the present disclosure. Wireless communications system 200 may include a core network 205 (e.g., a next generation core network (NGC)), an IAB donor 210, IAB nodes 215, and UEs 115, where IAB nodes 215 may be partially controlled by each other and/or the IAB donor 210. The IAB donor 210 and IAB nodes 215 may be examples of aspects of base stations 105, and core network 205 may be an example of aspects of core network 130, as described with reference to FIG. 1. IAB donor 210 and one or more IAB nodes 215 may be configured as (e.g., or in communication according to) some relay chain.

For example, an access network (AN) may refer to communications between access nodes (e.g., IAB donor 210), IAB nodes 215-a and 215-b, and one or more UEs 115 (e.g., UEs 115-b, 115-c, and 115-d). The IAB donor 210 may facilitate connection between the core network 205 and the AN (e.g., via a wireline or wireless connection to the core network 205). That is, an IAB donor 210 may refer to a radio access network (RAN) node with a wireline or wireless connection to core network 205. The IAB donor 210 may include a CU 220 and at least one DU 225, where the CU 220 may communicate with the core network 205 over an NG interface (e.g., some backhaul link). The CU 220 may host layer 2 (L3) (e.g., radio resource control (RRC), service data adaption protocol (SDAP), packet data convergence protocol (PDCP), etc.) functionality and signaling. The at least one DU 225 may host lower layer, such as layer 1 (L1) and layer 2 (L2) (e.g., radio link control (RLC), media access control (MAC), physical (PHY), etc.) functionality and signaling, and may each be at least partially controlled by the CU 220. The DU 225 may support one or multiple different cells. IAB donor 210 and IAB nodes 215-a and 215-b may communicate over an F1 interface according to some protocol that defines signaling messages (e.g., F1-AP protocol). Additionally, CU 220 may communicate with the core network 205 over an NG interface (which may be an example of a portion of backhaul link), and may communicate with other CUs 220 (e.g., a CU associated with an alternative IAB donor 210) over an Xn-C interface (which may be an example of a portion of a backhaul link).

IAB nodes 215 may refer to a RAN node that provides IAB functionality (e.g., access for UEs 115, wireless self-backhauling capabilities, etc.). IAB nodes 215 may include a distributed unit (DU) 225 and a mobile terminal (MT) 230. A DU 225 may act as a distributed scheduling node towards child nodes associated with the IAB node 215, and the MT 230 may act as a scheduled node towards parent nodes associated with the IAB node 215. That is, an IAB donor 210 may be referred to as a parent node in communication with one or more child nodes (e.g., an IAB donor may relay transmissions for UEs through one or more other IAB nodes 215). Additionally, an IAB node 215 may also be referred to as a parent node or a child node to other IAB nodes 215, depending on the relay chain or configuration of the AN. Therefore, the MT entity of IAB nodes 215 (e.g., MTs 230) may provide a Uu interface for a child node to receive signaling from a parent IAB node, and the DU interface (e.g., DUs 225) may provide a Uu interface for a parent node to signal to a child IAB node or UE 115.

For example, IAB node 215-a may be referred to a parent node associated with IAB node 215-b, and a child node associated with IAB donor 210. The IAB donor 210 may include a CU 220 with a wireline (e.g., optical fiber) or wireless connection to the core network 205, and may act as parent node to IAB nodes 215-a and 215-b. For example, the DU 225 of IAB donor 210 may relay transmissions to UEs 115-c and 115-d through IAB nodes 215-a and 215-b, and may directly signal transmissions to the UE 115-b. The CU 220 of IAB donor 210 may signal communication link establishment via an F1 interface to IAB nodes 215-a and 215-b, and the IAB nodes 215-a and 215-b may schedule transmissions (e.g., transmissions to the UEs 115 relayed from the IAB donor 210) through the DUs 225. That is, data may be relayed to and from IAB nodes 215-a and 215-b via signaling over an NR Uu interface to MT 230 of the IABs node 215-a and 215-b. Communications with IAB node 215-a may be scheduled by DU 225 of IAB donor 210 and communications with IAB node 215-b may be scheduled by DU 225 of IAB Node 215-a.

As described herein, the wireless communications system 200 may support nodes configured with sidelink functionality. For example, IAB nodes 215-a and 215-b include sidelink functionality 235. As described in further detail with reference to FIG. 3, the sidelink functionality 235 may be implemented separate from the DU 225 and MT 230 or may be integrated with one or both of the DU 225 and MT 230. Further, the DU 225, MT 230, and/or the sidelink functionality 235 may be collocated or non-collocated.

An IAB node that is implemented with sidelink functionality, such as IAB node 215-a and 215-b may establish a signaling connection with the IAB donor 210 and a sidelink connection to a sidelink peer, which may be an example of another IAB node 215 or a UE 115. In some cases, the signaling connection is an example of a F1 connection between the DU 225 of the IAB node 215 and the CU 220 of the IAB donor 210. In some cases, the signaling connection is an example of an RRC connection between the MT 230 of the IAB node 215 and the DU 225 of the IAB donor 210. As illustrated in FIG. 2, the IAB node 215-a may establish a signaling connection with the IAB donor 210 (e.g., an F1 connection or an RRC connection) and a sidelink connection with UE 115-c. The IAB node 215-a may communicate one or more data messages over the signaling connection with the IAB donor and one or more data messages over the sidelink connection with the UE 115-c. Similarly, the IAB node 215-b may establish the signaling connection with the IAB donor 210 and a sidelink connection with the UE 115-d, and may communicate data messages over both connections.

In some examples, in order to facilitate communications using the sidelink functionality 235, an IAB donor may report (e.g., to the core network 205) an indication that the IAB node supports sidelink communications (e.g., a sidelink capability message 240). The capability indication may be transmitted via the signaling connection with the IAB donor 210 (e.g., via the RRC or F1 connection). In some cases, the sidelink capability may be reported in conjunction with an IAB-node capability. More particularly, the IAB node 215 may report its capability to both serve as an IAB node and perform sidelink communication. The capability may be for the control plane, the user plane, or both for either or both IAB functionality and sidelink functionality. In some cases, the IAB node 215 may indicate (with or separate from the capability indication) a number of sidelink connections that may be established by the IAB node 215 (e.g., a number of simultaneous sidelink connections). The number of sidelink connections that are indicated may be an upper limit on the quantity of sidelink connections that are supportable by the IAB node 215. The IAB node 215 may report the capability (e.g., number of sidelink connections, control plane, user plane, both) per sidelink peer (e.g., whether another UE 115 or another IAB node 215).

In some examples, the IAB node 215 may broadcast that IAB node 215 supports both IAB and sidelink functionality (e.g., the sidelink capability message 240 is broadcast). In an example, support for both IAB and sidelink functionality may be broadcast by the DU 225 of the IAB node 215 in system information, such as a system information block type 1 (SIB1) message. In another example, the support for both IAB and sidelink functionality may be broadcast by the MT 230 or the sidelink functionality 235 using a discovery signal (e.g., a SL discovery signal). The capability reporting may be based on a transmission or timing configuration that is configured at the IAB node 215. For example, the IAB node 215-*a* may receive an SSB transmission configuration (STC) and/or an SSB measurement timing configuration (SMTC). For example, the STC configuration for a first IAB node 215 may specify timing and resources that the first IAB node 215 is to use for transmitting one or more SSBs for discovery by other nodes. Further, the SMTC configuration for a second IAB node 215 may indicate timing and resources that the second IAB node 215 is to use for searching and measurement the SSB discovery signals. Accordingly, the STC configuration of the first IAB node 215 and the SMTC configuration of the second IAB node 215 be aligned to facilitate discovery of the first node by the second node, provided that the two nodes are within a transmission range of each other. Thus, the CU 220 may choose to configure the IAB nodes 215, which are sidelink capable, with aligned STC/SMTC configurations so that they may detect one another establish a sidelink connection.

The sidelink capable IAB node 215 may receive, from the core network 205 (e.g., via the IAB donor 210), an indication that the IAB node is authorized to communicate via sidelink (e.g., a sidelink authorization indication 245) and serve IAB functionality. In some cases, the sidelink authorization may include sidelink configuration information, which may be similar to the capability information discussed herein. In some cases, the configuration information is indicated to the IAB node 215 separate from the sidelink authorization. For example, the core network 205 may indicate that the IAB node 215 is authorized to use the sidelink functionality 235 in the control pane, user plane, or both, a number of sidelink connections that the IAB node 215 is authorized to establish, in addition to this information per sidelink peer (e.g., UE 115 or IAB node 215). In some cases, the configuration information is indicated by the CU 220 of the IAB donor 210.

Additionally or alternatively, the IAB donor 210 may support the IAB nodes 215 in supporting the sidelink functionality 235. For example, the IAB donor 210 may receive the sidelink capability message 240 and perform various operations for facilitating sidelink communications. For example, the IAB donor 210 may select a management entity in the core network 205 based on the sidelink capability message 240. A management entity may be an example of an access mobility management function (AMF), a mobility management entity (MME), or the like. For example, the IAB donor 210 may select a management entity that supports both IAB and sidelink. Additionally, the IAB donor 210 may indicate the sidelink capability of the IAB node 215 (e.g., in addition to the IAB capability) to the core network 205. Further, the IAB donor 210 may receive, from the core network 205, an indication that the IAB node 215 is authorized to perform the sidelink communication. This authorization may be relayed to the IAB node 215, as described above.

In some cases, the IAB node 215 may report capability, receive authorization, and/receive sidelink configuration information on the same signaling connection with the IAB donor 210. In other cases, the IAB node 215 may report capability, receive authorization and/or configuration information on one or more separate connections (e.g., a separate signaling connection) with the IAB donor 210 or on a separate connection to another base station 105, which may also function as an IAB donor. The separate connection (to the same IAB donor 210 or another base station) may be an RRC or a F1 connection.

In cases where an IAB node 215 uses separate connections with the IAB donor 210 for supporting sidelink functionality 235 and IAB functionality, the IAB node may report that the signaling connection for IAB functionality (RRC for MT 230 or F1 for DU 225) and the signaling connection for sidelink functionality correspond to the same IAB node 215. This signaling may support topology discovery in the IAB network. For example, the IAB node 215-*a* may include on the second signaling connection (e.g., the signaling connection supporting sidelink functionality) an indication of the backhaul adaptation protocol address (BAP) address allocated to the IAB node 215-*a* by the IAB donor 210 on the first signaling connection. Thus, the IAB donor 210 may determine that the signaling connections correspond to the same IAB node 215-*a*.

In some examples, the IAB node 215 may report a duplexing constraint between the MT 230, DU 225, and sidelink functionality 235. The constraint may be indicated as a part of or separate from the sidelink capability message 240. The constraint may indicate whether the IAB node 215 supports half or full duplex communications between the MT 230, DU 225, and sidelink functionality 235 and various combinations of these components. As described with reference to FIG. 3, the duplexing constraint of the IAB node 215 may be dependent on the architecture of the IAB node 215, including whether the sidelink functionality 235 is integrated with the MT 230 and the DU 225 and whether the various components (e.g., MT 230, DU 225, and sidelink functionality 235) are collocated or non-collocated.

An IAB node 215 may receive an indication from a parent node (e.g., a parent IAB node 215) that the parent node supports SL and IAB functionality. For example, the IAB node 215-*b* may receive, from the IAB node 215-*a* (which may be a parent node of IAB node 215-*b*), an indication that the IAB node 215-*a* is capable of supporting SL communications. The child IAB node 215-*b* may perform a parent cell selection based on receipt of the indication of sidelink support from the parent IAB node 215-*a*.

Figure 3:
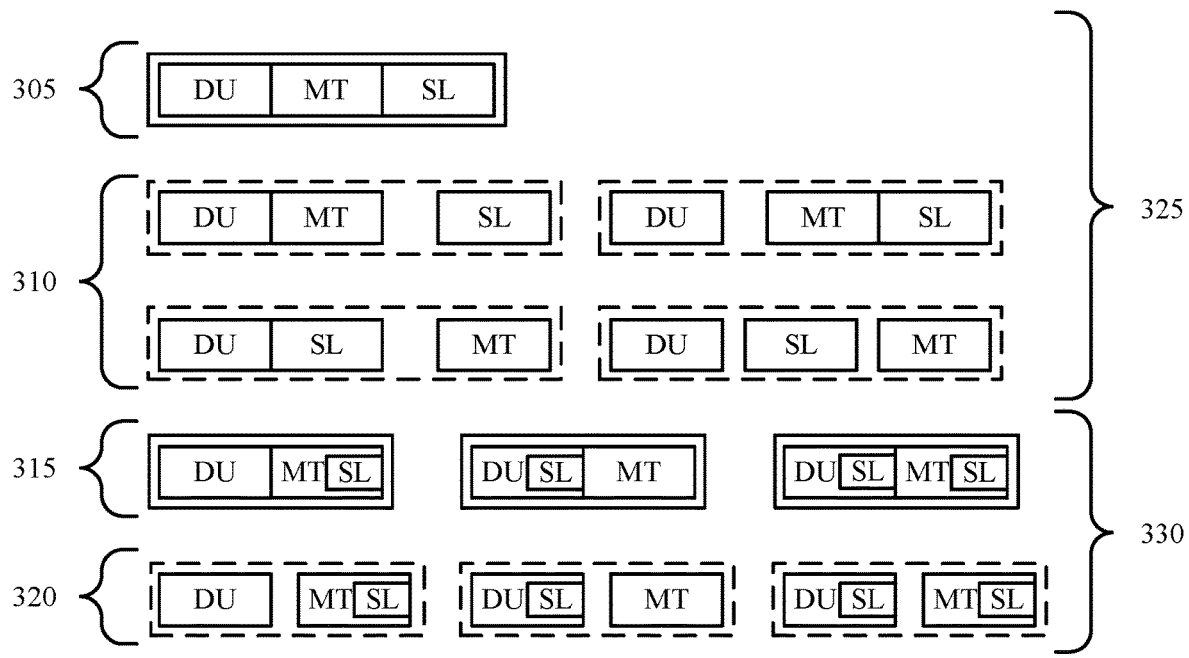
FIG. 3 illustrates examples of IAB node architectures for integrated access and backhaul with sidelink in accordance with aspects of the present disclosure.

FIG. 3 illustrates examples of IAB node architectures 300 for integrated access and backhaul with sidelink in accordance with aspects of the present disclosure. The IAB node architectures 300 illustrate various configurations for IAB nodes that may implement and support sidelink communications. The IAB nodes illustrated in FIG. 3 may be implemented in IAB networks. In some cases, an IAB network may include one or more of the configurations illustrated in FIG. 3. The IAB node architecture 300 includes a first set of IAB nodes 325 and a second set of IAB nodes 330.

The first set of IAB nodes 325 include sidelink functionality in addition to a DU and a MT. Thus, the IAB nodes of the first set of IAB nodes 325 may include radio frequency circuitry, antennas, and the like that are separate from the such components corresponding to the MT and DU of the IAB node. More particularly, in the first set of IAB nodes 325, the components used for sidelink communications may not be used to support DU or MT functionality. At 305, an IAB node architecture is shown that includes the DU, MT, and sidelink functionality in a collocated configuration (e.g., collocated components 335), meaning that the physical components that support the respective DU, MT, a sidelink functionality may be located in a same physical location. At 310, the functionalities may be non-collocated (e.g., non-collocated components 340), meaning that some components may be physically separated. In some cases, the components corresponding to two of the functionalities may be collocated, while the components corresponding to the third functionality may be in another physical location. For example, the DU and MT may be collocated, while the components corresponding to the sidelink functionality may be in a separate location. Other types of non-collated configurations are illustrated at 310. In one example implementation for non-collocated components, an MT may be positioned at an external location relative to a building, such as on the roof or top of the building, while the DU and/or sidelink functionality may be internal such as to serve UEs (e.g., UEs 115 of FIG. 1) within the building.

The second set of IAB nodes 330 includes the sidelink functionality that is integrated within DU and/or MT of the IAB nodes. More particularly, the sidelink functionality may be supported by the components that support the DU and MT functionality. The IAB nodes at 315 include a collocated DU and MT (e.g., collocated components 335), with the sidelink functionality implemented in one or both of the DU and MT. The IAB nodes at 310 include a non-collocated DU and MT (e.g., non-collocated components 340), with sidelink functionality implemented one or both of the DU and MT. Thus, when sidelink is a functionality of the IAB node, the sidelink functionality may be in a separate physical location or collocated with an MT and/or DU. When the sidelink functionality is implemented in a MT and/or DU, it may be collocated with that MT/DU.

The configurations for the IAB nodes illustrated in FIG. 3 may support the various features described herein. For example, the IAB nodes of FIG. 3 may establish a signaling connection win an IAB donor and a sidelink connection with a peer node (e.g., a UE or another IAB node). The sidelink connection may be established responsive to capability reporting (e.g., an indication of sidelink capability) by the IAB node. The IAB nodes may communicate with the IAB donor via the signaling connection and with the sidelink peer via the sidelink connection. In some cases, such communications may be performed in a half or full-duplexed manner. Whether the communications are half or full duplex may depend on the IAB node configuration as well as the various communication links. For example, if the sidelink functionality is implemented in the DU or MT, then the communications with the IAB donor and the sidelink peer may be performed in a half-duplex manner.

In some examples, an IAB node may include multiple instances of one or more functionalities, including a DU, MT, or Sidelink functionality. In some cases, a particular functionality may be defined by a connection, and as such, multiple instances of a functionality may correspond to multiple connections associated with the functionality. For example, a DU may be defined as an F1 connection between an IAB node and a CU. An MT may be defined as an RRC connection between an MT of an IAB node and a CU an IAB donor. A sidelink functionality may be defined as a sidelink connection (e.g., over a PC5 interface) between an IAB node and a SL peer (e.g., another IAB node or a UE) or between two UEs. Thus, when an IAB node has multiple instances of a particular functionality, there may be multiple connections of the respective functionality type. As described herein, since the functionalities may be collocated with or non-collocated with other functionalities, various types of configurations are contemplated within the scope of the present disclosure. For example, in the case of multiple SL functionalities, each instance of the sidelink functionality (e.g., each SL connection) may be collocated with one of the DU or MT functionalities (which may be collocated or not), collocated with none of the DU or MT functionalities, collocated with other SL functionalities, or may be disallowed from being collocated with other SL functionalities.

Figure 4:
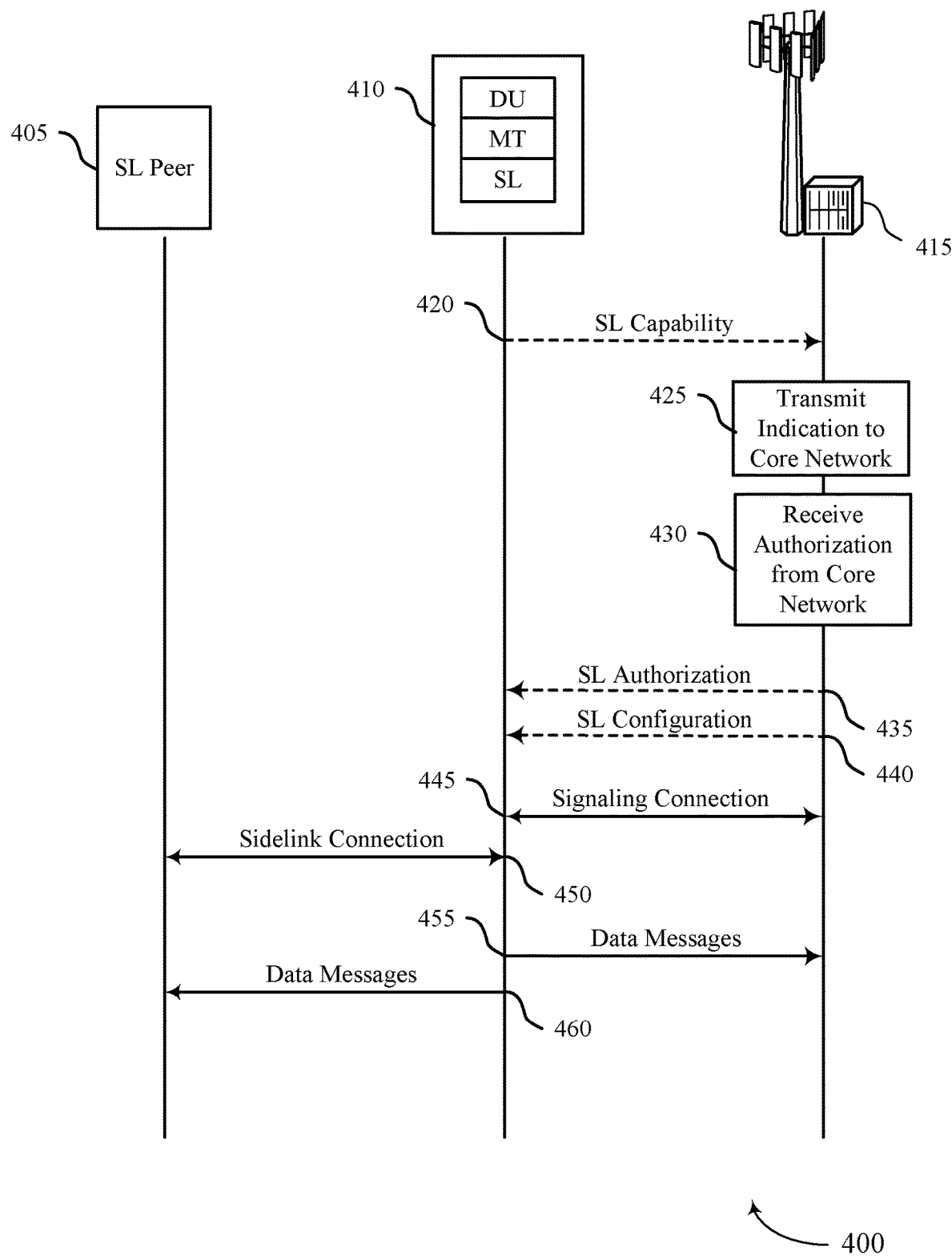
FIG. 4 illustrates an example of a process flow diagram that supports architecture for integrated access and backhaul with sidelink in accordance with aspects of the present disclosure.

FIG. 4 illustrates an example of a process flow diagram 400 that supports architecture for integrated access and backhaul with sidelink in accordance with aspects of the present disclosure. The process flow diagram 400 includes an IAB donor 415, an IAB node 410, and a sidelink peer 405. The IAB donor may be an example of IAB donor 210 as described with respect to FIG. 2, a base station 105 as described with respect to FIG. 1, or both. The IAB node 410 (e.g., a first IAB node) may be an example of one of the IAB nodes described with respect to FIG. 3, IAB nodes 215 as described with respect to FIG. 2, or both. The sidelink peer 405 may be an example of an IAB node or a UE 115. The IAB node 410 may be implemented with a DU, MT, and Sidelink functionality, as described with respect to FIGS. 1 through 3. The DU, MT, and sidelink functionality may be collocated or non-collocated, and the sidelink functionality may be integrated with (e.g., part of the respective MT or DU functionality) or separate from the DU and MT, as described with respect to FIG. 3. When the sidelink functionality is integrated with the DU or MT, it may be similar to a UEs support of sidelink communications.

At 420, the first IAB node 410 may transmit, to the IAB donor 415, an indication that the first IAB node supports the sidelink communications. The indication may be an example of a sidelink capability message that indicates that the first IAB node 410 supports the sidelink communications in a control plane, that the first IAB node s410 supports the sidelink communications in a user plane, an upper limit on a quantity of sidelink connections supportable by the first IAB node 410, or a combination thereof. The sidelink capability indication may be transmitted in conjunction with or separate from an IAB functionality capability indication. The capability indication may be indicated per sidelink peer.

At 430, the IAB donor 415 may transmit, to a core network and based at least in part on the received indication that the first IAB node supports sidelink communications, a request for authorization for the first IAB node to perform the sidelink communications. At 435, the IAB donor 415 may receive, from the core network, based at least in part in response to transmitting the request, an indication of the authorization to perform the sidelink communications.

At 435, the first IAB node 410 may receive from a core network (e.g., via the IAB donor 415), an indication that specifies that the first IAB node 410 is authorized to perform the sidelink communications. The authorization indication may include an indication of a sidelink configuration that indicates that the first IAB node 410 is authorized to perform sidelink communications in a control plane, that the first IAB node 410 is authorized to perform sidelink communications in a user plane, an upper limit on a quantity of sidelink connections that the first IAB node 410 is authorized to establish, or a combination thereof. In some cases, the sidelink configuration is indicated per sidelink peer. The authorization indication may be received on a signaling connection.

At 440, the first IAB node 410 may receive, from the IAB donor 415 (e.g., the CU of the IAB donor 415), a sidelink configuration that the first IAB node 410 is to use to establish the sidelink connection with the second IAB node or the UE. In some cases, the capability indication at 420, the authorization indication at 435, and the sidelink configuration information at 440 may be communicated on the same signaling connection to the IAB donor 415. In other cases, these indications and the information may be communicated on separate signaling connections to the same IAB donor 415 or another base station (e.g., another IAB donor).

At 445, the first IAB node 410 may establish a signaling connection with an IAB donor. The signaling connection may be established before one or more of the operations at 420 through 440 or after one or more of the operations at 420 through 440. In some cases, the signaling connection is established to support the sidelink functionality of the first IAB node 410 in response to the sidelink capability indication.

At 450, the first IAB node 410 may establish a sidelink connection with a sidelink peer 405, which may be a second IAB node or a UE. The sidelink connection may be established based on the authorization, the configuration information, or both.

At 455, the first IAB node 410 may transmit a first one or more data messages to the IAB donor node via the established signaling connection. At 460, the first IAB node may transmit a second one or more data messages to the second IAB node or the UE via the established sidelink connection.

Figure 5:
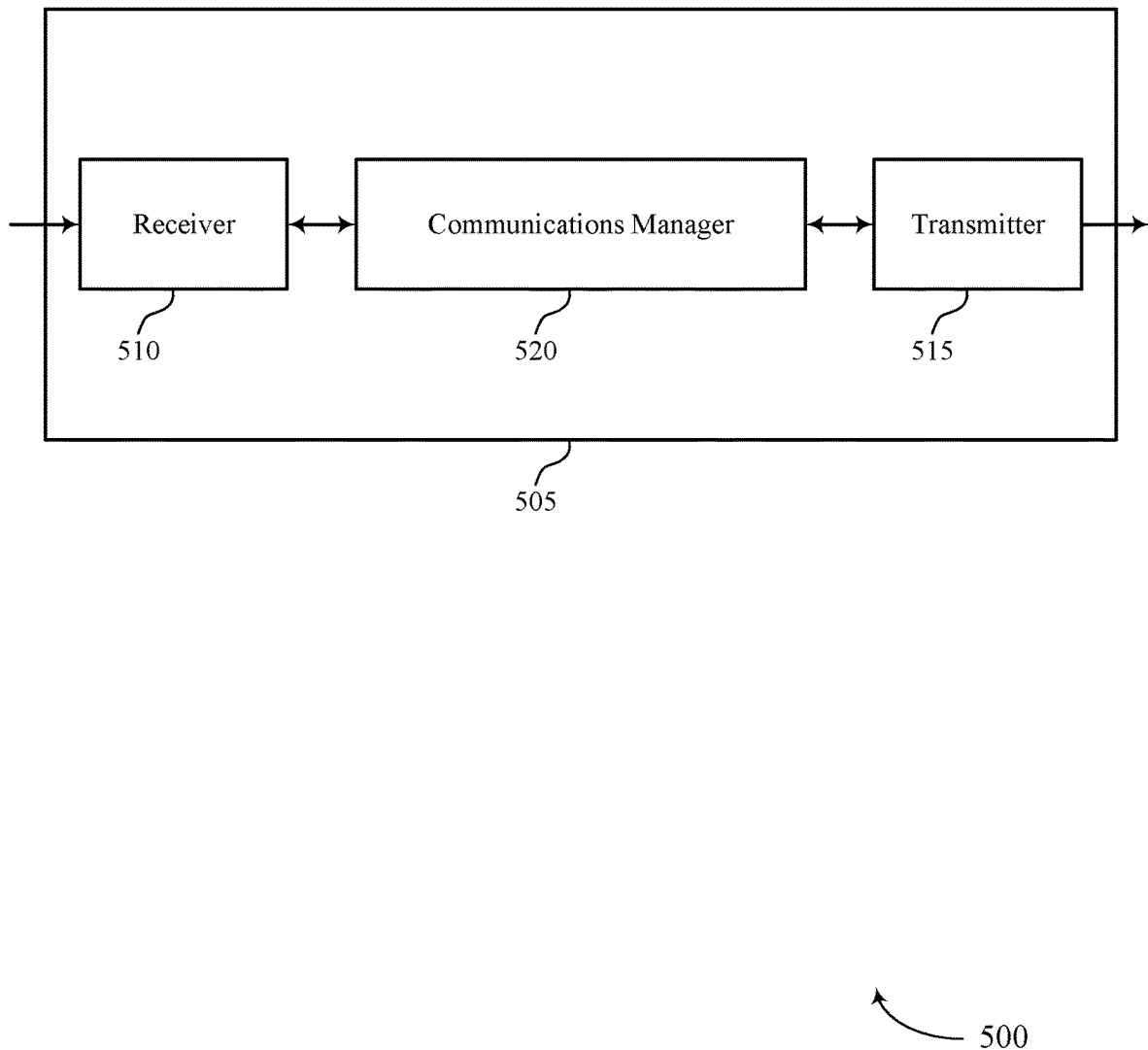
FIGS. 5 and 6 show block diagrams of devices that support architecture for integrated access and backhaul with sidelink in accordance with aspects of the present disclosure.

FIG. 5 shows a block diagram 500 of a device 505 that supports architecture for integrated access and backhaul with sidelink in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to architecture for integrated access and backhaul with sidelink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to architecture for integrated access and backhaul with sidelink). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of architecture for integrated access and backhaul with sidelink as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an ASIC, a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first integrated access and backhaul (IAB) node in accordance with examples as disclosed herein. For example, the communications manager 520 may be configured as or otherwise support a means for establishing, by the first IAB node, a signaling connection with an IAB donor node and a sidelink connection with a second IAB node or a UE, where the first IAB node includes a mobile termination unit and a distributed unit, and supports sidelink communications. The communications manager 520 may be configured as or otherwise support a means for transmitting a first one or more data messages to the IAB donor node via the established signaling connection. The communications manager 520 may be configured as or otherwise support a means for transmitting a second one or more data messages to the second IAB node or the UE via the established sidelink connection.

Additionally or alternatively, the communications manager 520 may support wireless communication at an integrated access and backhaul (IAB) donor node in accordance with examples as disclosed herein. For example, the communications manager 520 may be configured as or otherwise support a means for receiving from a second IAB node, an indication that the second IAB node supports sidelink communications. The communications manager 520 may be configured as or otherwise support a means for transmitting, to a core network and based on the received indication that the second IAB node supports sidelink communications, a request for authorization for the second IAB node to perform the sidelink communications. The communications manager 520 may be configured as or otherwise support a means for receiving, based at least in part in response to transmitting the request, an indication of the authorization to perform the sidelink communications. The communications manager 520 may be configured as or otherwise support a means for transmitting, to the second IAB node, a sidelink configuration that the second IAB node is to use to establish a sidelink connection with a third IAB node or a UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources by allocating some communications to sidelink resources.

Figure 6:
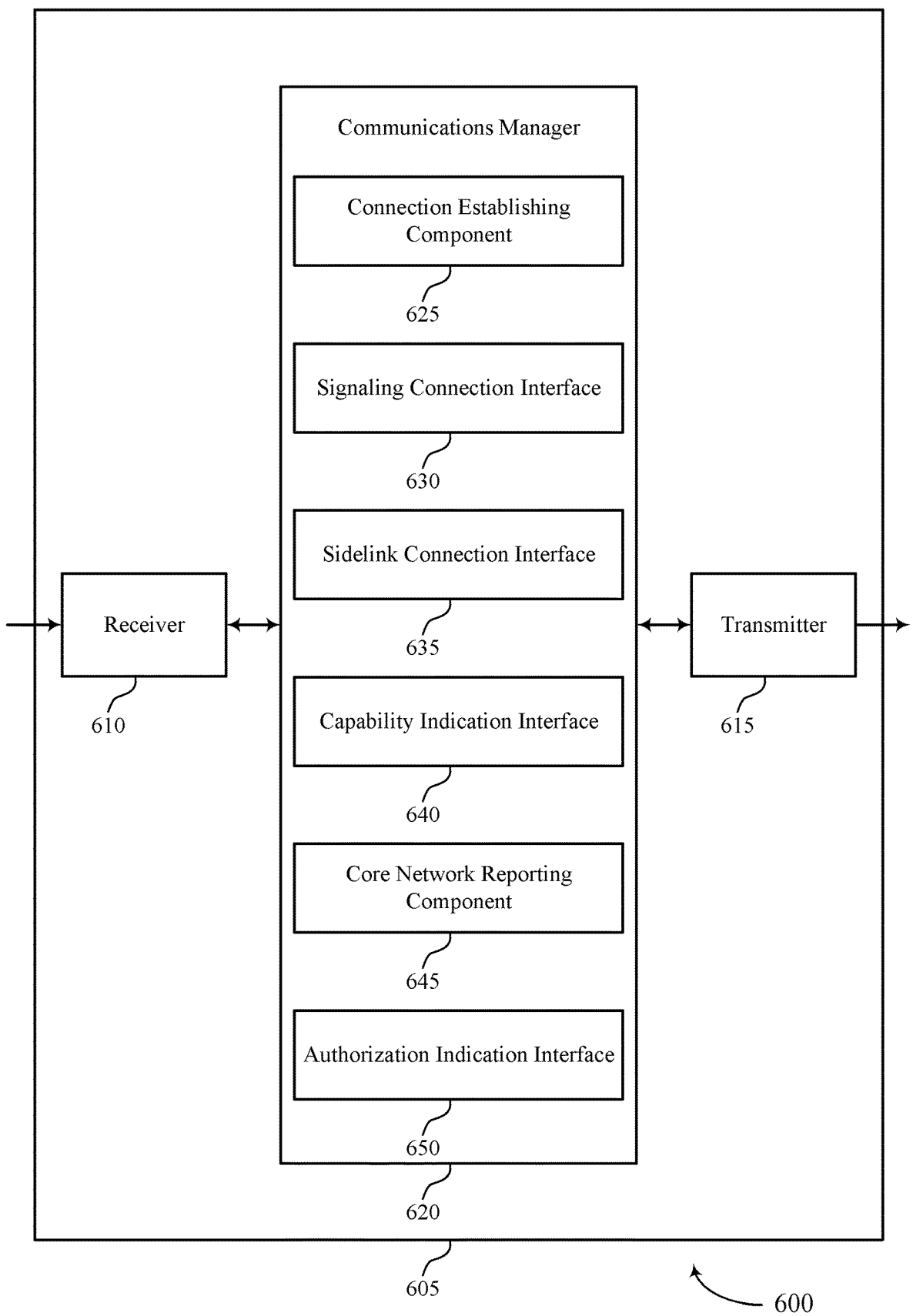

FIG. 6 shows a block diagram 600 of a device 605 that supports architecture for integrated access and backhaul with sidelink in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to architecture for integrated access and backhaul with sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to architecture for integrated access and backhaul with sidelink). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of architecture for integrated access and backhaul with sidelink as described herein. For example, the communications manager 620 may include a connection establishing component 625, a signaling connection interface 630, a sidelink connection interface 635, a capability indication interface 640, a core network reporting component 645, an authorization indication interface 650, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first integrated access and backhaul (IAB) node in accordance with examples as disclosed herein. The connection establishing component 625 may be configured as or otherwise support a means for establishing, by the first IAB node, a signaling connection with an IAB donor node and a sidelink connection with a second IAB node or a UE, where the first IAB node includes a mobile termination unit and a distributed unit, and supports sidelink communications. The signaling connection interface 630 may be configured as or otherwise support a means for transmitting a first one or more data messages to the IAB donor node via the established signaling connection. The sidelink connection interface 635 may be configured as or otherwise support a means for transmitting a second one or more data messages to the second IAB node or the UE via the established sidelink connection.

Additionally or alternatively, the communications manager 620 may support wireless communication at an integrated access and backhaul (IAB) donor node in accordance with examples as disclosed herein. The capability indication interface 640 may be configured as or otherwise support a means for receiving from a second IAB node, an indication that the second IAB node supports sidelink communications. The core network reporting component 645 may be configured as or otherwise support a means for transmitting, to a core network and based on the received indication that the second IAB node supports sidelink communications, a request for authorization for the second IAB node to perform the sidelink communications. The authorization indication interface 650 may be configured as or otherwise support a means for receiving, based at least in part in response to transmitting the request, an indication of the authorization to perform the sidelink communications. The sidelink connection interface 635 may be configured as or otherwise support a means for transmitting, to the second IAB node, a sidelink configuration that the second IAB node is to use to establish a sidelink connection with a third IAB node or a UE.

Figure 7:
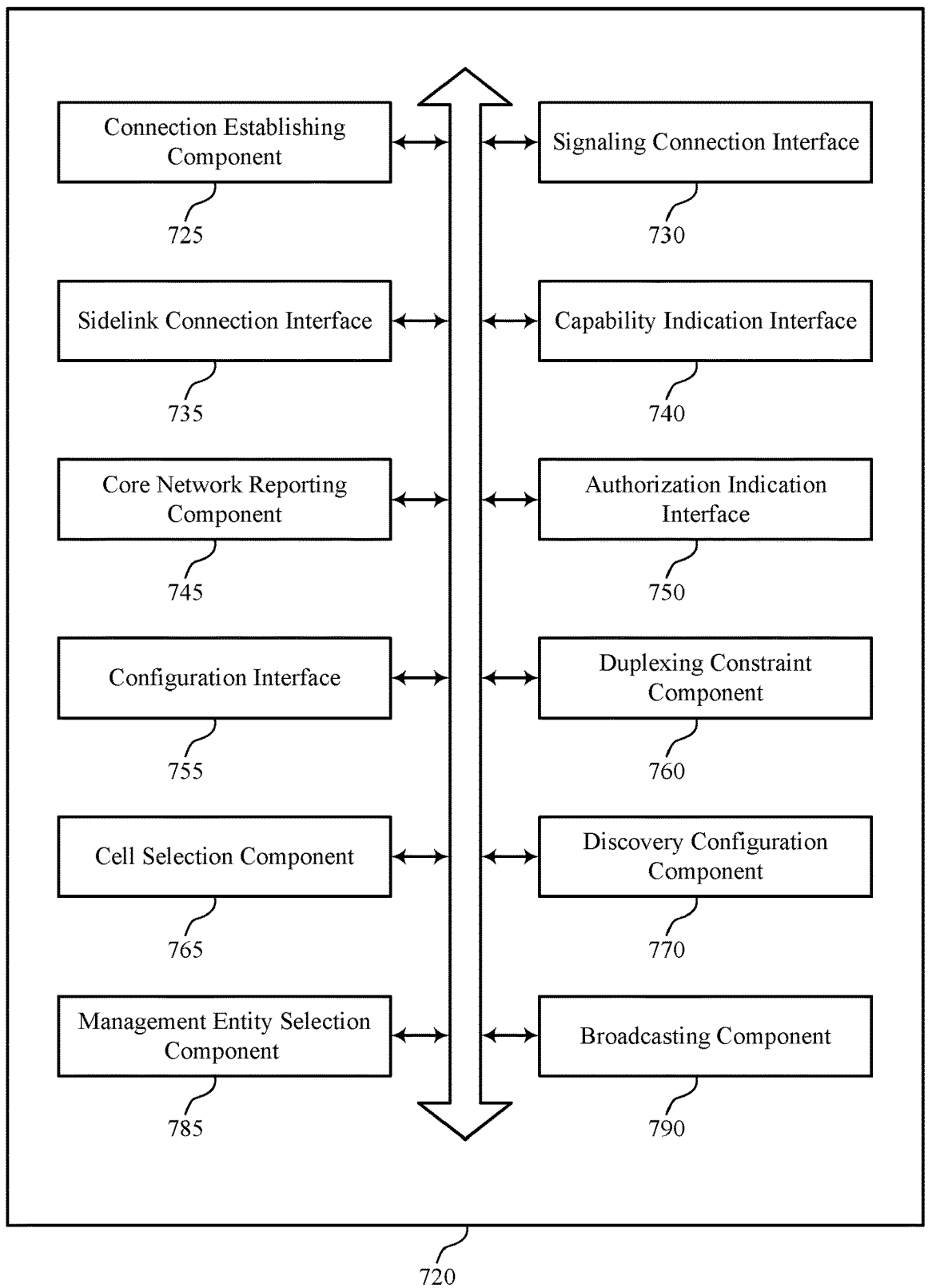
FIG. 7 shows a block diagram of a communications manager that supports architecture for integrated access and backhaul with sidelink in accordance with aspects of the present disclosure.

FIG. 7 shows a block diagram 700 of a communications manager 720 that supports architecture for integrated access and backhaul with sidelink in accordance with aspects of the present disclosure. The communications manager 720 may be an example of aspects of a communications manager 520, a communications manager 620, or both, as described herein. The communications manager 720, or various components thereof, may be an example of means for performing various aspects of architecture for integrated access and backhaul with sidelink as described herein. For example, the communications manager 720 may include a connection establishing component 725, a signaling connection interface 730, a sidelink connection interface 735, a capability indication interface 740, a core network reporting component 745, an authorization indication interface 750, a configuration interface 755, a duplexing constraint component 760, a cell selection component 765, a discovery configuration component 770, a management entity selection component 785, a broadcasting component 790, or any combination thereof. Each of these components may communicate, directly or indirectly, with one another (e.g., via one or more buses).

The communications manager 720 may support wireless communication at a first integrated access and backhaul (IAB) node in accordance with examples as disclosed herein. The connection establishing component 725 may be configured as or otherwise support a means for establishing, by the first IAB node, a signaling connection with an IAB donor node and a sidelink connection with a second IAB node or a UE, where the first IAB node includes a mobile termination unit and a distributed unit, and supports sidelink communications. The signaling connection interface 730 may be configured as or otherwise support a means for transmitting a first one or more data messages to the IAB donor node via the established signaling connection. The sidelink connection interface 735 may be configured as or otherwise support a means for transmitting a second one or more data messages to the second IAB node or the UE via the established sidelink connection.

In some examples, the capability indication interface 740 may be configured as or otherwise support a means for transmitting, by the first IAB node, an indication that the first IAB node supports the sidelink communications, where the sidelink connection is established based on the transmitted indication.

In some examples, to support transmitting the indication, the capability indication interface 740 may be configured as or otherwise support a means for transmitting a sidelink capability message, where the sidelink capability message indicates that the first IAB node supports the sidelink communications in a control plane, that the first IAB node supports the sidelink communications in a user plane, an upper limit on a quantity of sidelink connections supportable by the first IAB node, or a combination thereof. In some examples, the sidelink capability message is indicated per sidelink peer.

In some examples, to support transmitting the indication, the capability indication interface 740 may be configured as or otherwise support a means for transmitting the indication that specifies that the first IAB node supports the sidelink communications in conjunction with an indication the first IAB node supports IAB node communications.

In some examples, to support transmitting the indication, the capability indication interface 740 may be configured as or otherwise support a means for transmitting the indication on the signaling connection with the IAB donor node, or on a separate connection with the IAB donor node, or on a separate connection with a base station separate from the IAB donor node.

In some examples, to support transmitting the indication, the broadcasting component 790 may be configured as or otherwise support a means for broadcasting the indication that the first IAB node supports the sidelink communications.

In some examples, to support broadcasting the indication, the broadcasting component 790 may be configured as or otherwise support a means for broadcasting, by the distributed unit of the first IAB node, system information including the indication, or. In some examples, to support broadcasting the indication, the broadcasting component 790 may be configured as or otherwise support a means for broadcasting, by the mobile termination unit or a sidelink functionality of the first IAB node, a discovery signal including the indication, or. In some examples, to support broadcasting the indication, the broadcasting component 790 may be configured as or otherwise support a means for a combination thereof.

In some examples, the authorization indication interface 750 may be configured as or otherwise support a means for receiving, from a core network, an indication that specifies that the first IAB node is authorized to perform the sidelink communications, where the sidelink connection is established based on the received indication.

In some examples, to support receiving the indication, the authorization indication interface 750 may be configured as or otherwise support a means for receiving a sidelink configuration that indicates that the first IAB node is authorized to perform sidelink communications in a control plane, that the first IAB node is authorized to perform sidelink communications in a user plane, an upper limit on a quantity of sidelink connections that the first IAB node is authorized to establish, or a combination thereof. In some examples, the sidelink configuration is indicated per sidelink peer.

In some examples, to support receiving the indication, the authorization indication interface 750 may be configured as or otherwise support a means for receiving the indication in conjunction with an indication that the first IAB node is authorized to perform IAB communications.

In some examples, to support receiving the indication, the authorization indication interface 750 may be configured as or otherwise support a means for receiving the indication on the signaling connection with the IAB donor node, or on a separate connection with the IAB donor node, or on a separate connection with a base station separate from the IAB donor node.

In some examples, the configuration interface 755 may be configured as or otherwise support a means for receiving, from a central unit of the IAB donor node, a sidelink configuration that the first IAB node is to use to establish the sidelink connection with the second IAB node or the UE.

In some examples, to support establishing the signaling connection, the signaling connection interface 730 may be configured as or otherwise support a means for establishing, by the mobile termination unit of the first IAB node, a radio resources control connection with a donor unit of the IAB donor node. In some examples, to support establishing the signaling connection, the signaling connection interface 730 may be configured as or otherwise support a means for establishing, by the distributed unit of the first IAB node, an F1 connection with a central unit of the IAB donor node, or. In some examples, to support establishing the signaling connection, the signaling connection interface 730 may be configured as or otherwise support a means for any combination thereof.

In some examples, to support establishing the signaling connection, the signaling connection interface 730 may be configured as or otherwise support a means for establishing the signaling connection as a second signaling connection to support the sidelink communications for the first IAB node separate from a first signaling connection to support IAB functionality for the first IAB node.

In some examples, the signaling connection interface 730 may be configured as or otherwise support a means for transmitting an indication that the first signaling connection and the second signaling connection correspond to the first IAB node.

In some examples, the duplexing constraint component 760 may be configured as or otherwise support a means for transmitting, to the IAB donor node via the signaling connection, a duplexing constraint associated with communications via the mobile termination unit, the distributed unit, and the sidelink connection for the first IAB node.

In some examples, the capability indication interface 740 may be configured as or otherwise support a means for receiving, from a third IAB node, an indication that the third IAB node supports the sidelink communications. In some examples, the cell selection component 765 may be configured as or otherwise support a means for performing parent cell selection based on the indication received from the third IAB node.

In some examples, the discovery configuration component 770 may be configured as or otherwise support a means for receiving, in response to transmitting the indication that the first IAB node supports the sidelink communications, at least one configuration for communicating one or more synchronization signal blocks (SSBs) to facilitate discovery of the first IAB node, one or more second IAB nodes, or one or more UEs. In some examples, the discovery configuration component 770 may be configured as or otherwise support a means for communicating the one or more SSBs based at least in part on the at least one configuration, where the sidelink connection is established in part in response to communicating the one or more SSBs.

In some examples, the first IAB node includes one or more sidelink functions to support the sidelink communications. In some examples, the one or more sidelink functions are separate from one or more distributed units of the first IAB node, one or more mobile termination units of the first IAB node, or both.

In some examples, the first IAB node includes one or more sidelink functions to support the sidelink communications. In some examples, the one or more sidelink functions are collocated with the one or more donor units, the one or more mobile termination units, or both.

In some examples, the one or more sidelink functions are integrated with the one or donor units, the one or more mobile termination units, or both.

Additionally or alternatively, the communications manager 720 may support wireless communication at an integrated access and backhaul (IAB) donor node in accordance with examples as disclosed herein. The capability indication interface 740 may be configured as or otherwise support a means for receiving from a second IAB node, an indication that the second IAB node supports sidelink communications. The core network reporting component 745 may be configured as or otherwise support a means for transmitting, to a core network and based on the received indication that the second IAB node supports sidelink communications, a request for authorization for the second IAB node to perform the sidelink communications. The authorization indication interface 750 may be configured as or otherwise support a means for receiving, based at least in part in response to transmitting the request, an indication of the authorization to perform the sidelink communications. In some examples, the sidelink connection interface 735 may be configured as or otherwise support a means for transmitting, to the second IAB node, a sidelink configuration that the second IAB node is to use to establish a sidelink connection with a third IAB node or a UE.

In some examples, to support receiving the indication, the capability indication interface 740 may be configured as or otherwise support a means for receiving a sidelink capability message, where the sidelink capability message indicates that the second IAB node supports the sidelink communications in a control plane, that the second IAB node supports the sidelink communications in a user plane, an upper limit on a quantity of sidelink connections supportable by the first IAB node, or a combination thereof.

In some examples, to support transmitting the sidelink configuration, the configuration interface 755 may be configured as or otherwise support a means for transmitting, to the second IAB node, the sidelink configuration that indicates that the second IAB node is authorized to perform sidelink communications in a control plane, that the second IAB node is authorized to perform sidelink communications in a user plane, an upper limit on a quantity of sidelink connections that the second IAB node is authorized to establish, or a combination thereof.

In some examples, the management entity selection component 785 may be configured as or otherwise support a means for selecting a management entity at the core network based on receiving the indication.

Figure 8:
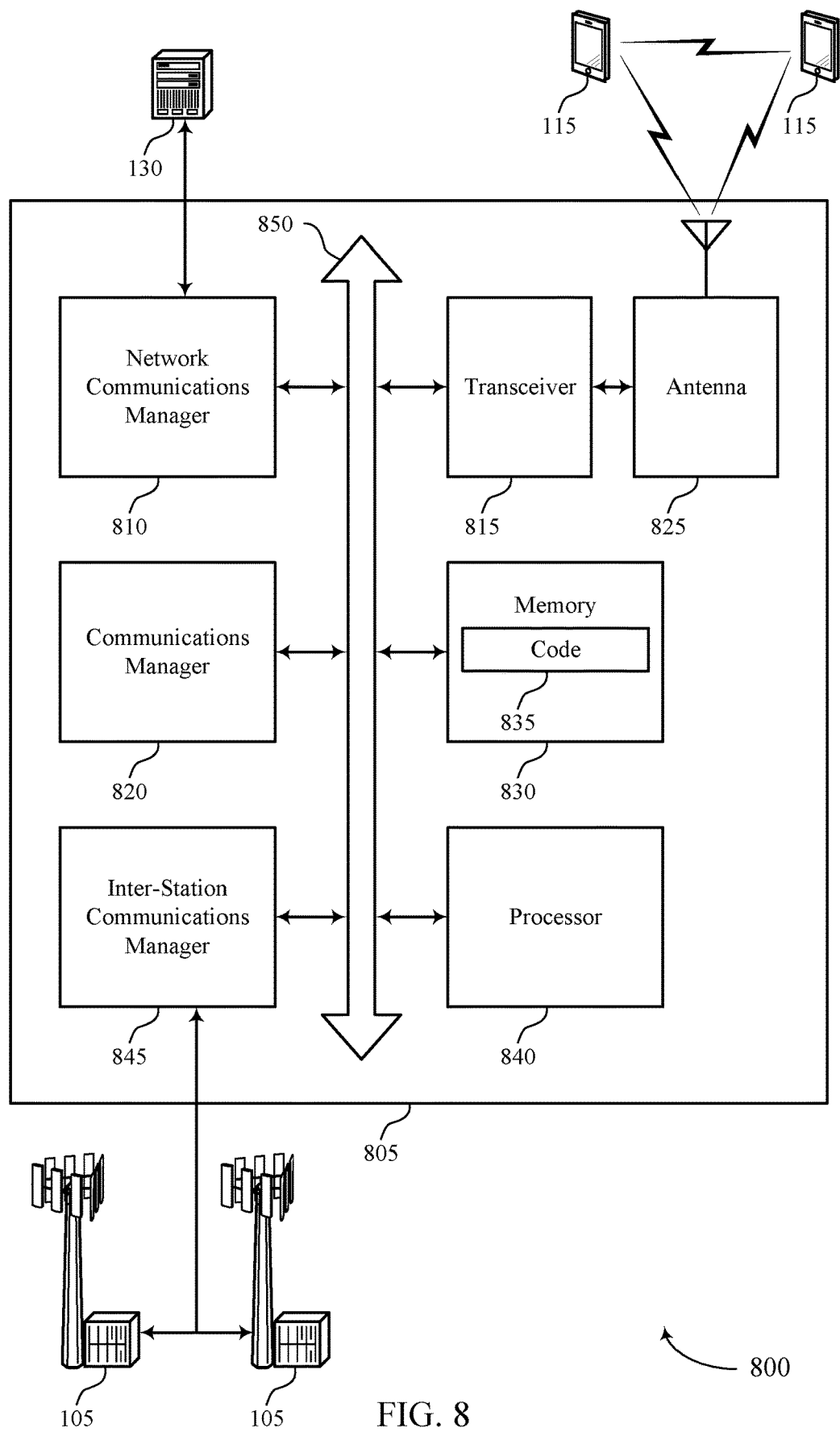
FIG. 8 shows a diagram of a system including a device that supports architecture for integrated access and backhaul with sidelink in accordance with aspects of the present disclosure.

FIG. 8 shows a diagram of a system 800 including a device 805 that supports architecture for integrated access and backhaul with sidelink in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting architecture for integrated access and backhaul with sidelink). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a first integrated access and backhaul (IAB) node in accordance with examples as disclosed herein. For example, the communications manager 820 may be configured as or otherwise support a means for establishing, by the first IAB node, a signaling connection with an IAB donor node and a sidelink connection with a second IAB node or a UE, where the first IAB node includes a mobile termination unit and a distributed unit, and supports sidelink communications. The communications manager 820 may be configured as or otherwise support a means for transmitting a first one or more data messages to the IAB donor node via the established signaling connection. The communications manager 820 may be configured as or otherwise support a means for transmitting a second one or more data messages to the second IAB node or the UE via the established sidelink connection.

Additionally or alternatively, the communications manager 820 may support wireless communication at an integrated access and backhaul (IAB) donor node in accordance with examples as disclosed herein. For example, the communications manager 820 may be configured as or otherwise support a means for receiving from a second IAB node, an indication that the second IAB node supports sidelink communications. The communications manager 820 may be configured as or otherwise support a means for transmitting, to a core network and based on the received indication that the second IAB node supports sidelink communications, a request for authorization for the second IAB node to perform the sidelink communications. The communications manager 820 may be configured as or otherwise support a means for receiving, based at least in part in response to transmitting the request, an indication of the authorization to perform the sidelink communications. The communications manager 820 may be configured as or otherwise support a means for transmitting, to the second IAB node, a sidelink configuration that the second IAB node is to use to establish a sidelink connection with a third IAB node or a UE.

By including or configuring the communications manager 820 in accordance with examples as described herein, the device 805 may support techniques for more efficient utilization of communication resources and improved coordination between devices by leveraging sidelink functionality, which may offload coordination overhead from a base station devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of architecture for integrated access and backhaul with sidelink as described herein, or the processor 840 and the memory 830 may be otherwise configured to perform or support such operations.

Figure 9:
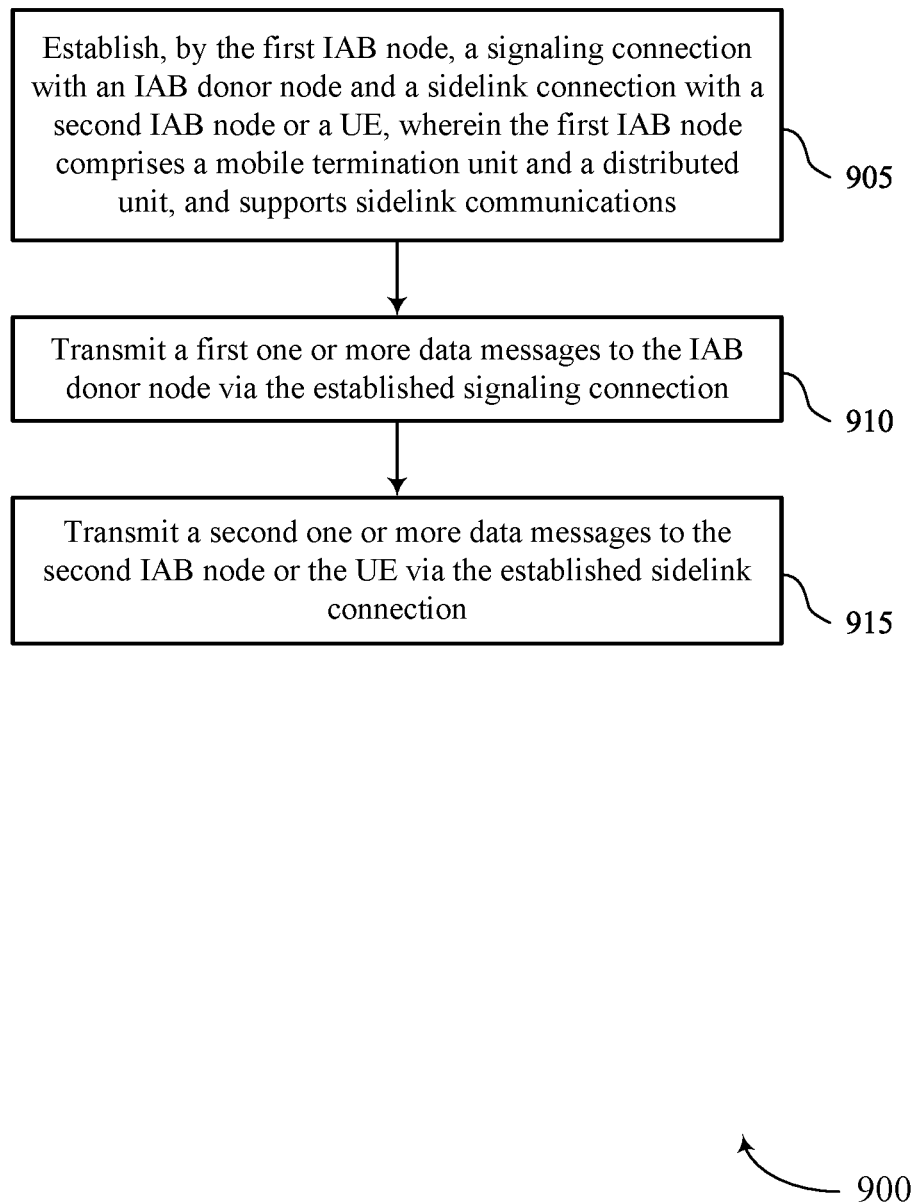
FIGS. 9 through 12 show flowcharts illustrating methods that support architecture for integrated access and backhaul with sidelink in accordance with aspects of the present disclosure.

FIG. 9 shows a flowchart illustrating a method 900 that supports architecture for integrated access and backhaul with sidelink in accordance with aspects of the present disclosure. The operations of the method 900 may be implemented by a base station or its components as described herein. For example, the operations of the method 900 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 905, the method may include establishing, by the first IAB node, a signaling connection with an IAB donor node and a sidelink connection with a second IAB node or a UE, where the first IAB node includes a mobile termination unit and a distributed unit, and supports sidelink communications. The operations of 905 may be performed in accordance with examples as disclosed herein. In some examples, aspects of the operations of 905 may be performed by a connection establishing component 725 as described with reference to FIG. 7.

At 910, the method may include transmitting a first one or more data messages to the IAB donor node via the established signaling connection. The operations of 910 may be performed in accordance with examples as disclosed herein. In some examples, aspects of the operations of 910 may be performed by a signaling connection interface 730 as described with reference to FIG. 7.

At 915, the method may include transmitting a second one or more data messages to the second IAB node or the UE via the established sidelink connection. The operations of 915 may be performed in accordance with examples as disclosed herein. In some examples, aspects of the operations of 915 may be performed by a sidelink connection interface 735 as described with reference to FIG. 7.

Figure 10:
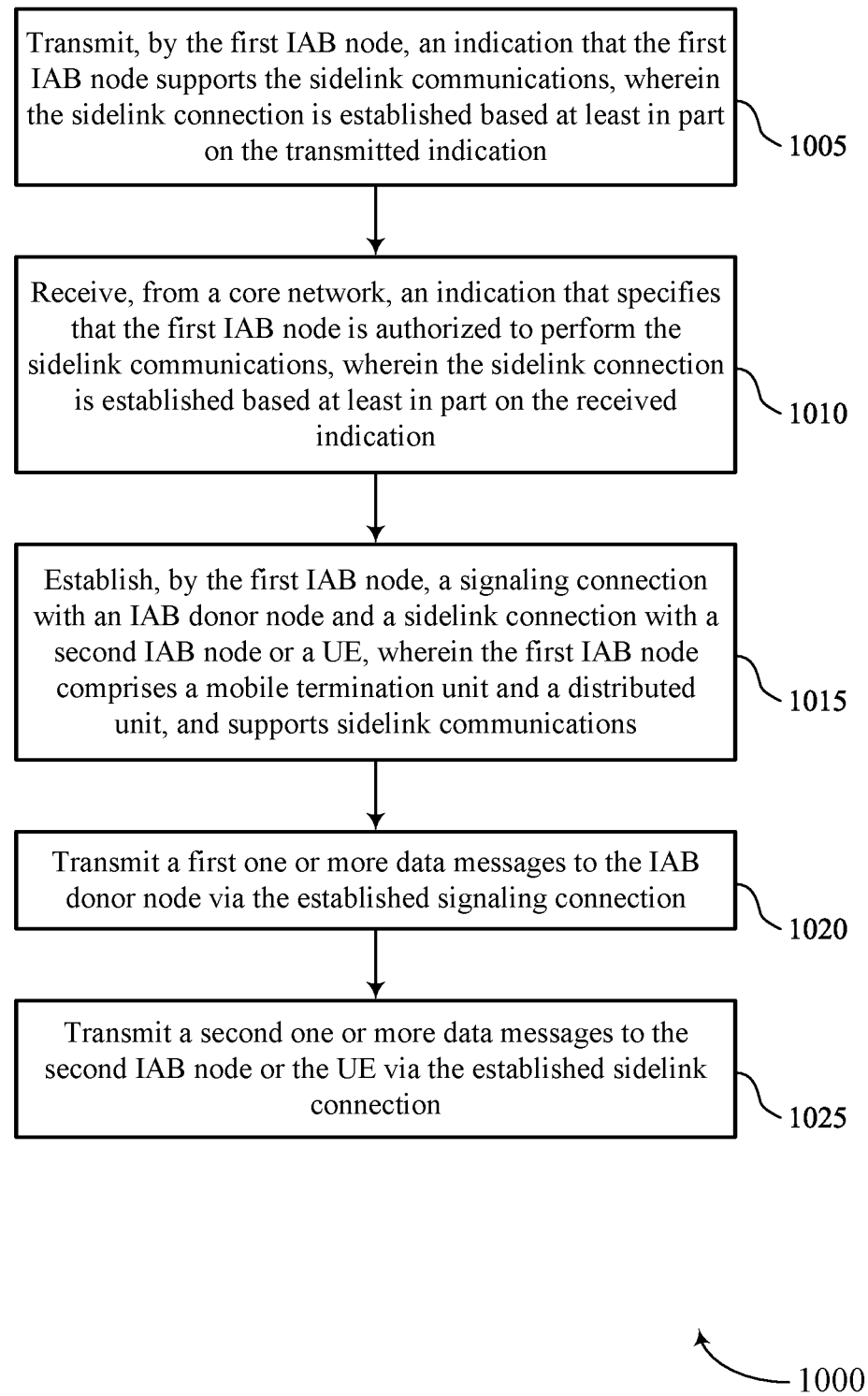

FIG. 10 shows a flowchart illustrating a method 1000 that supports architecture for integrated access and backhaul with sidelink in accordance with aspects of the present disclosure. The operations of the method 1000 may be implemented by a base station or its components as described herein. For example, the operations of the method 1000 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1005, the method may include transmitting, by the first IAB node, an indication that the first IAB node supports the sidelink communications, where the sidelink connection is established based on the transmitted indication. The operations of 1005 may be performed in accordance with examples as disclosed herein. In some examples, aspects of the operations of 1005 may be performed by a capability indication interface 740 as described with reference to FIG. 7.

At 1010, the method may include receiving, from a core network, an indication that specifies that the first IAB node is authorized to perform the sidelink communications, where the sidelink connection is established based on the received indication. The operations of 1010 may be performed in accordance with examples as disclosed herein. In some examples, aspects of the operations of 1010 may be performed by an authorization indication interface 750 as described with reference to FIG. 7.

At 1015, the method may include establishing, by the first IAB node, a signaling connection with an IAB donor node and a sidelink connection with a second IAB node or a UE, where the first IAB node includes a mobile termination unit and a distributed unit, and supports sidelink communications. The operations of 1015 may be performed in accordance with examples as disclosed herein. In some examples, aspects of the operations of 1015 may be performed by a connection establishing component 725 as described with reference to FIG. 7.

At 1020, the method may include transmitting a first one or more data messages to the IAB donor node via the established signaling connection. The operations of 1020 may be performed in accordance with examples as disclosed herein. In some examples, aspects of the operations of 1020 may be performed by a signaling connection interface 730 as described with reference to FIG. 7.

At 1025, the method may include transmitting a second one or more data messages to the second IAB node or the UE via the established sidelink connection. The operations of 1025 may be performed in accordance with examples as disclosed herein. In some examples, aspects of the operations of 1025 may be performed by a sidelink connection interface 735 as described with reference to FIG. 7.

Figure 11:
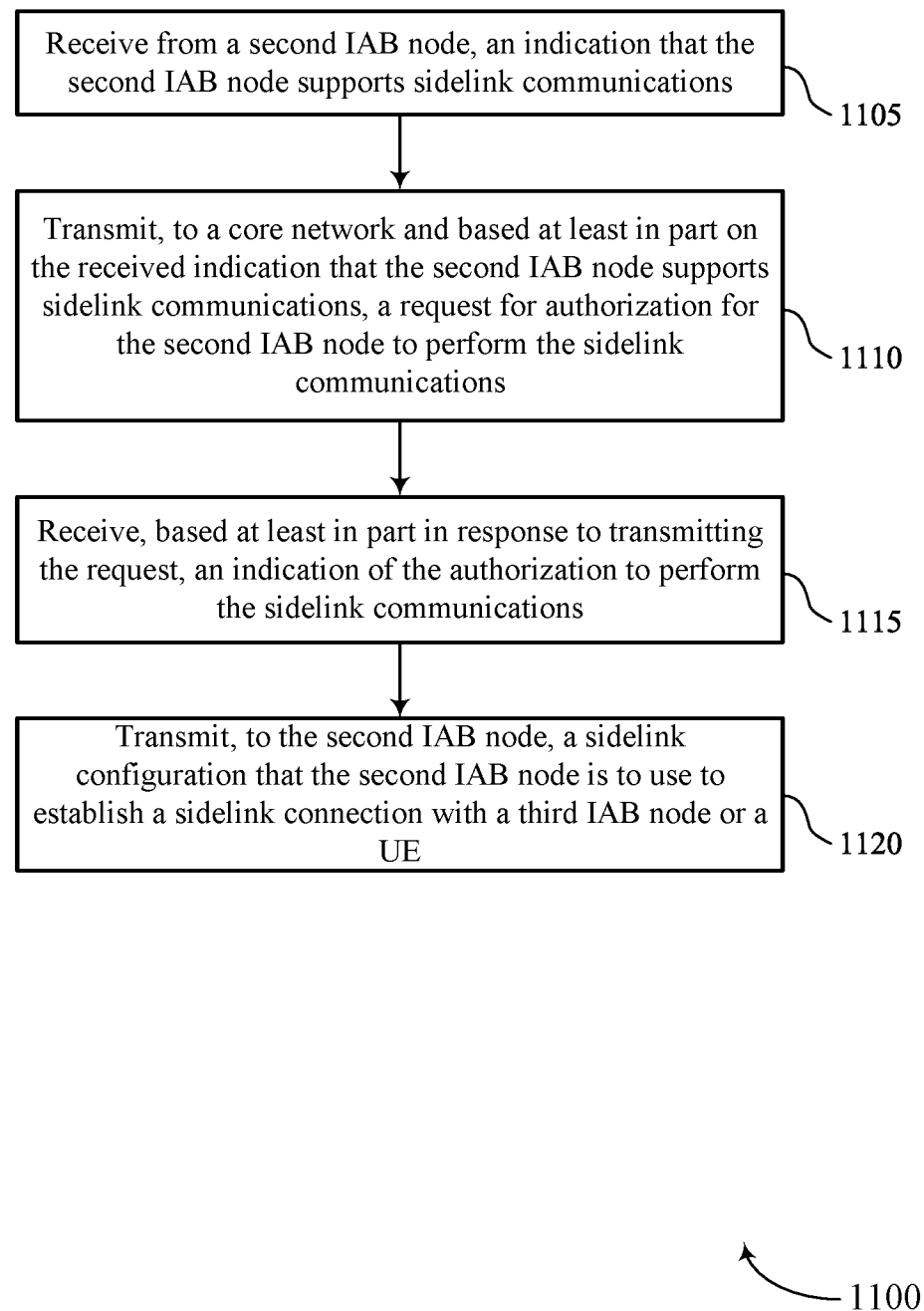

FIG. 11 shows a flowchart illustrating a method 1100 that supports architecture for integrated access and backhaul with sidelink in accordance with aspects of the present disclosure. The operations of the method 1100 may be implemented by a base station or its components as described herein. For example, the operations of the method 1100 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1105, the method may include receiving from a second IAB node, an indication that the second IAB node supports sidelink communications. The operations of 1105 may be performed in accordance with examples as disclosed herein. In some examples, aspects of the operations of 1105 may be performed by a capability indication interface 740 as described with reference to FIG. 7.

At 1110, the method may include transmitting, to a core network and based on the received indication that the second IAB node supports sidelink communications, a request for authorization for the second IAB node to perform the sidelink communications. The operations of 1110 may be performed in accordance with examples as disclosed herein. In some examples, aspects of the operations of 1110 may be performed by a core network reporting component 745 as described with reference to FIG. 7.

At 1115, the method may include receiving, based at least in part in response to transmitting the request, an indication of the authorization to perform the sidelink communications. The operations of 1115 may be performed in accordance with examples as disclosed herein. In some examples, aspects of the operations of 1115 may be performed by an authorization indication interface 750 as described with reference to FIG. 7.

At 1120, the method may include transmitting, to the second IAB node, a sidelink configuration that the second IAB node is to use to establish a sidelink connection with a third IAB node or a UE. The operations of 1120 may be performed in accordance with examples as disclosed herein. In some examples, aspects of the operations of 1120 may be performed by a sidelink connection interface 735 as described with reference to FIG. 7.

Figure 12:
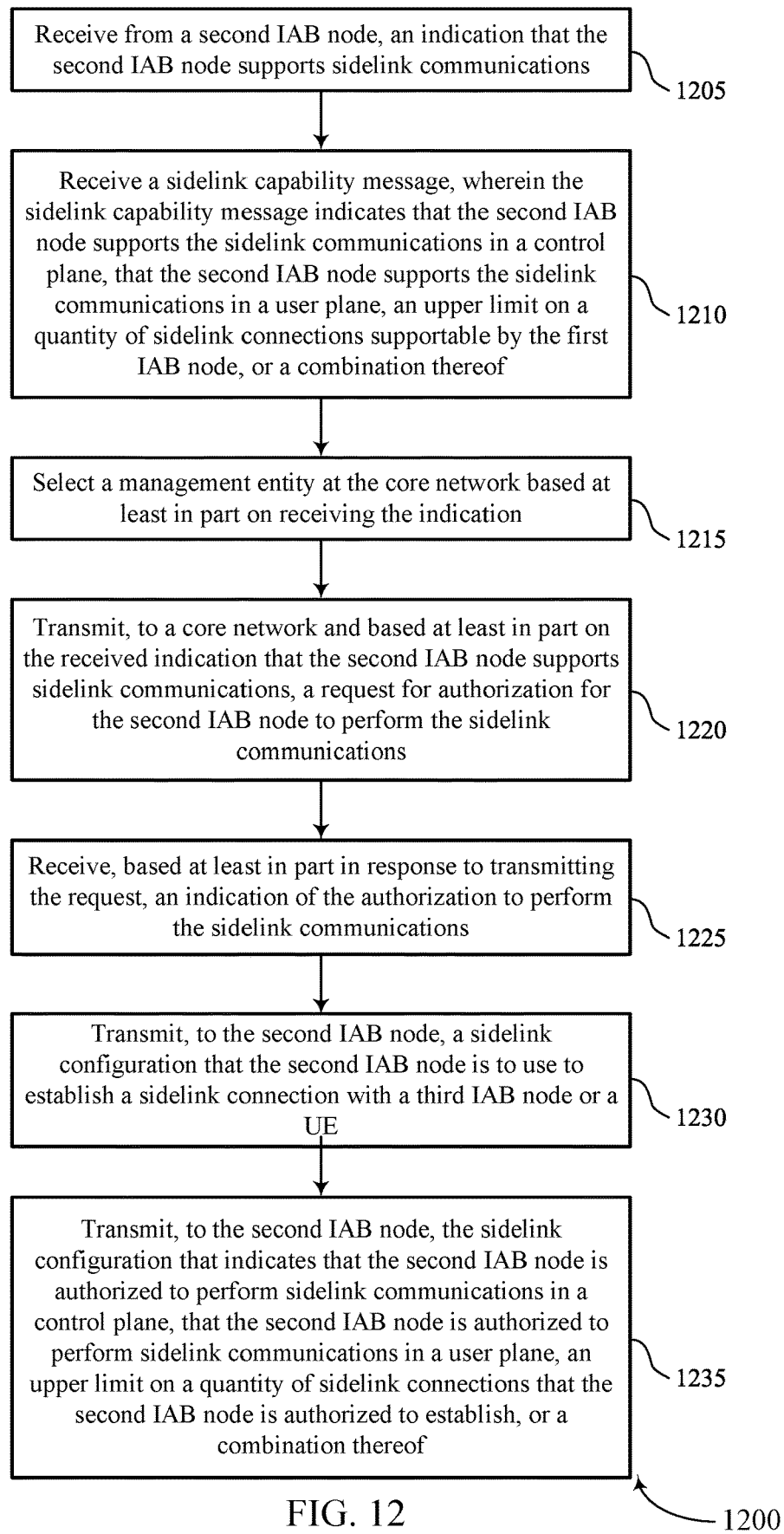

FIG. 12 shows a flowchart illustrating a method 1200 that supports architecture for integrated access and backhaul with sidelink in accordance with aspects of the present disclosure. The operations of the method 1200 may be implemented by a base station or its components as described herein. For example, the operations of the method 1200 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1205, the method may include receiving from a second IAB node, an indication that the second IAB node supports sidelink communications. The operations of 1205 may be performed in accordance with examples as disclosed herein. In some examples, aspects of the operations of 1205 may be performed by a capability indication interface 740 as described with reference to FIG. 7.

At 1210, the method may include receiving a sidelink capability message, where the sidelink capability message indicates that the second IAB node supports the sidelink communications in a control plane, that the second IAB node supports the sidelink communications in a user plane, an upper limit on a quantity of sidelink connections supportable by the first IAB node, or a combination thereof. The operations of 1210 may be performed in accordance with examples as disclosed herein. In some examples, aspects of the operations of 1210 may be performed by a capability indication interface 740 as described with reference to FIG. 7.

At 1215, the method may include selecting a management entity at the core network based on receiving the indication. The operations of 1215 may be performed in accordance with examples as disclosed herein. In some examples, aspects of the operations of 1215 may be performed by a management entity selection component 785 as described with reference to FIG. 7.

At 1220, the method may include transmitting, to a core network and based on the received indication that the second IAB node supports sidelink communications, a request for authorization for the second IAB node to perform the sidelink communications. The operations of 1220 may be performed in accordance with examples as disclosed herein. In some examples, aspects of the operations of 1220 may be performed by a core network reporting component 745 as described with reference to FIG. 7.

At 1225, the method may include receiving, based at least in part in response to transmitting the request, an indication of the authorization to perform the sidelink communications. The operations of 1225 may be performed in accordance with examples as disclosed herein. In some examples, aspects of the operations of 1225 may be performed by an authorization indication interface 750 as described with reference to FIG. 7.

At 1230, the method may include transmitting, to the second IAB node, a sidelink configuration that the second IAB node is to use to establish a sidelink connection with a third IAB node or a UE. The operations of 1230 may be performed in accordance with examples as disclosed herein. In some examples, aspects of the operations of 1230 may be performed by a sidelink connection interface 735 as described with reference to FIG. 7.

At 1235, the method may include transmitting, to the second IAB node, the sidelink configuration that indicates that the second IAB node is authorized to perform sidelink communications in a control plane, that the second IAB node is authorized to perform sidelink communications in a user plane, an upper limit on a quantity of sidelink connections that the second IAB node is authorized to establish, or a combination thereof. The operations of 1235 may be performed in accordance with examples as disclosed herein. In some examples, aspects of the operations of 1235 may be performed by a configuration interface 755 as described with reference to FIG. 7.

The following provides an overview of aspects of the present disclosure:

Aspect 1: A method for wireless communication at a first integrated access and backhaul (IAB) node, comprising: establishing, by the first IAB node, a signaling connection with an IAB donor node and a sidelink connection with a second IAB node or a UE, wherein the first IAB node comprises a mobile termination unit and a distributed unit, and supports sidelink communications; transmitting a first one or more data messages to the IAB donor node via the established signaling connection; and transmitting a second one or more data messages to the second IAB node or the UE via the established sidelink connection.

Aspect 2: The method of aspect 1, further comprising: transmitting, by the first IAB node, an indication that the first IAB node supports the sidelink communications, wherein the sidelink connection is established based at least in part on the transmitted indication.

Aspect 3: The method of aspect 2, wherein transmitting the indication comprises: transmitting a sidelink capability message, wherein the sidelink capability message indicates that the first IAB node supports the sidelink communications in a control plane, that the first IAB node supports the sidelink communications in a user plane, an upper limit on a quantity of sidelink connections supportable by the first IAB node, or a combination thereof.

Aspect 4: The method of aspect 3, wherein the sidelink capability message indicated a sidelink capability per sidelink peer.

Aspect 5: The method of any of aspects 2 through 4, wherein the transmitting the indication comprises: transmitting the indication that specifies that the first IAB node supports the sidelink communications in conjunction with an indication the first IAB node supports IAB node communications.

Aspect 6: The method of any of aspects 2 through 5, wherein the transmitting the indication comprises: transmitting the indication on the signaling connection with the IAB donor node, or on a separate connection with the IAB donor node, or on a separate connection with a base station separate from the IAB donor node.

Aspect 7: The method of any of aspects 2 through 5, wherein the transmitting the indication comprises: broadcasting the indication that the first IAB node supports the sidelink communications.

Aspect 8: The method of aspect 7, wherein broadcasting the indication comprises: broadcasting, by the distributed unit of the first IAB node, system information including the indication, or; broadcasting, by the mobile termination unit or a sidelink functionality of the first IAB node, a discovery signal including the indication, or; and a combination thereof.

Aspect 9: The method of any of aspects 1 through 8, further comprising: receiving, from a core network, an indication that specifies that the first IAB node is authorized to perform the sidelink communications, wherein the sidelink connection is established based at least in part on the received indication.

Aspect 10: The method of aspect 9, wherein receiving the indication comprises: receiving a sidelink configuration that indicates that the first IAB node is authorized to perform sidelink communications in a control plane, that the first IAB node is authorized to perform sidelink communications in a user plane, an upper limit on a quantity of sidelink connections that the first IAB node is authorized to establish, or a combination thereof.

Aspect 11: The method of aspect 10, wherein the sidelink configuration is indicated per sidelink peer.

Aspect 12: The method of any of aspects 9 through 11, wherein receiving the indication comprises: receiving the indication in conjunction with an indication that the first IAB node is authorized to perform IAB communications.

Aspect 13: The method of any of aspects 9 through 12, wherein receiving the indication comprises: receiving the indication on the signaling connection with the IAB donor node, or on a separate connection with the IAB donor node, or on a separate connection with a base station separate from the IAB donor node.

Aspect 14: The method of any of aspects 1 through 13, further comprising: receiving, from a central unit of the IAB donor node, a sidelink configuration that the first IAB node is to use to establish the sidelink connection with the second IAB node or the UE.

Aspect 15: The method of any of aspects 1 through 14, wherein establishing the signaling connection comprises: establishing, by the mobile termination unit of the first IAB node, a radio resources control connection with a donor unit of the IAB donor node; establishing, by the distributed unit of the first IAB node, an F1 connection with a central unit of the IAB donor node, or; and any combination thereof.

Aspect 16: The method of any of aspects 1 through 15, wherein establishing the signaling connection comprises: establishing the signaling connection as a second signaling connection to support the sidelink communications for the first IAB node separate from a first signaling connection to support IAB functionality for the first IAB node.

Aspect 17: The method of aspect 16, further comprising: transmitting an indication that the first signaling connection and the second signaling connection correspond to the first IAB node.

Aspect 18: The method of any of aspects 1 through 17, further comprising: transmitting, to the IAB donor node via the signaling connection, a duplexing constraint associated with communications via the mobile termination unit, the distributed unit, and the sidelink connection for the first IAB node.

Aspect 19: The method of any of aspects 1 through 18, further comprising: receiving, from a third IAB node, an indication that the third IAB node supports the sidelink communications; and performing parent cell selection based at least in part on the indication received from the third IAB node.

Aspect 20: The method of any of aspects 1 through 19, further comprising: transmitting an indication that the first IAB node supports the sidelink communications; receiving, based at least in part in response to transmitting the indication, at least one configuration for communicating one or more synchronization signal blocks (SSBs) to facilitate discovery of the first IAB node, one or more second IAB nodes, or one or more UEs; and communicating the one or more SSBs based at least in part on the at least one configuration, wherein the sidelink connection is established based at least in part in response to communicating the one or more SSBs.

Aspect 21: The method of any of aspects 1 through 20, wherein the first IAB node includes one or more sidelink functions to support the sidelink communications; and the one or more sidelink functions are separate from one or more distributed units of the first IAB node, one or more mobile termination units of the first IAB node, or both.

Aspect 22: The method of any of aspects 1 through 21, wherein the first IAB node includes one or more sidelink functions to support the sidelink communications; and the one or more sidelink functions are collocated with the one or more donor units, the one or more mobile termination units, or both.

Aspect 23: The method of aspect 22, wherein the one or more sidelink functions are integrated with the one or donor units, the one or more mobile termination units, or both.

Aspect 24: A method for wireless communication at an integrated access and backhaul (IAB) donor node, comprising: receiving from a second IAB node, an indication that the second IAB node supports sidelink communications; transmitting, to a core network and based at least in part on the received indication that the second IAB node supports sidelink communications, a request for authorization for the second IAB node to perform the sidelink communications; receiving, based at least in part in response to transmitting the request, an indication of the authorization to perform the sidelink communications; and transmitting, to the second IAB node, a sidelink configuration that the second IAB node is to use to establish a sidelink connection with a third IAB node or a UE.

Aspect 25: The method of aspect 24, wherein receiving the indication comprises: receiving a sidelink capability message, wherein the sidelink capability message indicates that the second IAB node supports the sidelink communications in a control plane, that the second IAB node supports the sidelink communications in a user plane, an upper limit on a quantity of sidelink connections supportable by the first IAB node, or a combination thereof.

Aspect 26: The method of any of aspects 24 through 25, wherein transmitting the sidelink configuration comprises: transmitting, to the second IAB node, the sidelink configuration that indicates that the second IAB node is authorized to perform sidelink communications in a control plane, that the second IAB node is authorized to perform sidelink communications in a user plane, an upper limit on a quantity of sidelink connections that the second IAB node is authorized to establish, or a combination thereof.

Aspect 27: The method of any of aspects 24 through 26, further comprising: selecting a management entity at the core network based at least in part on receiving the indication.

Aspect 28: An apparatus for wireless communication at a first integrated access and backhaul (IAB) node, comprising a processor; memory coupled with the processor; and instructions stored in the memory and executable by the processor to cause the apparatus to perform a method of any of aspects 1 through 23.

Aspect 29: An apparatus for wireless communication at a first integrated access and backhaul (IAB) node, comprising at least one means for performing a method of any of aspects 1 through 23.

Aspect 30: A non-transitory computer-readable medium storing code for wireless communication at a first integrated access and backhaul (IAB) node, the code comprising instructions executable by a processor to perform a method of any of aspects 1 through 23.

Aspect 31: An apparatus for wireless communication at an integrated access and backhaul (IAB) donor node, comprising a processor; memory coupled with the processor; and instructions stored in the memory and executable by the processor to cause the apparatus to perform a method of any of aspects 24 through 27.

Aspect 32: An apparatus for wireless communication at an integrated access and backhaul (IAB) donor node, comprising at least one means for performing a method of any of aspects 24 through 27.

Aspect 33: A non-transitory computer-readable medium storing code for wireless communication at an integrated access and backhaul (IAB) donor node, the code comprising instructions executable by a processor to perform a method of any of aspects 24 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first integrated access and backhaul (IAB) node, comprising:

transmitting, by the first IAB node on a signaling connection with an IAB donor node, a separate connection with the IAB donor node, or a separate connection with a network device separate from the IAB donor node, an indication that the first IAB node supports sidelink communications;

establishing, by the first IAB node and based at least in part on the transmitted indication that the first IAB node supports the sidelink communications, the signaling connection with the IAB donor node and a sidelink connection with a second IAB node or a user equipment (UE), wherein the first IAB node comprises a mobile termination unit and a distributed unit, and supports the sidelink communications;

transmitting a first one or more data messages to the IAB donor node via the established signaling connection; and transmitting a second one or more data messages to the second IAB node or the UE via the established sidelink connection.

2. The method of claim 1, wherein transmitting the indication comprises:

transmitting a sidelink capability message, wherein the sidelink capability message indicates that the first IAB node supports the sidelink communications in a control plane, that the first IAB node supports the sidelink communications in a user plane, an upper limit on a quantity of sidelink connections supportable by the first IAB node, or a combination thereof.

3. The method of claim 2, wherein the sidelink capability message indicates a sidelink capability per sidelink peer.

4. The method of claim 1, wherein transmitting the indication comprises:
transmitting the indication that specifies that the first IAB node supports the sidelink communications in conjunction with an indication the first IAB node supports IAB node communications.

5. The method of claim 1, wherein transmitting the indication comprises:
broadcasting the indication that the first IAB node supports the sidelink communications.

6. The method of claim 5, wherein broadcasting the indication comprises:
broadcasting, by the distributed unit of the first IAB node, system information including the indication; or
broadcasting, by the mobile termination unit or a sidelink functionality of the first IAB node, a discovery signal including the indication; or
a combination thereof.

7. The method of claim 1, further comprising:
receiving, from a core network, an indication that specifies that the first IAB node is authorized to perform the sidelink communications, wherein the sidelink connection is established based at least in part on the received indication.

8. The method of claim 7, wherein receiving the indication comprises:
receiving a sidelink configuration that indicates that the first IAB node is authorized to perform the sidelink communications in a control plane, that the first IAB node is authorized to perform the sidelink communications in a user plane, an upper limit on a quantity of sidelink connections that the first IAB node is authorized to establish, or a combination thereof.

9. The method of claim 8, wherein the sidelink configuration is indicated per sidelink peer.

10. The method of claim 7, wherein receiving the indication comprises:
receiving the indication in conjunction with an indication that the first IAB node is authorized to perform IAB communications.

11. The method of claim 7, wherein receiving the indication comprises:
receiving the indication on the signaling connection with the IAB donor node, or on the separate connection with the IAB donor node, or on the separate connection with the network device separate from the IAB donor node.

12. The method of claim 1, further comprising:
receiving, from a central unit of the IAB donor node, a sidelink configuration that the first IAB node is to use to establish the sidelink connection with the second IAB node or the UE.

13. The method of claim 1, wherein establishing the signaling connection comprises:
establishing, by the mobile termination unit of the first IAB node, a radio resources control connection with a donor unit of the IAB donor node; or
establishing, by the distributed unit of the first IAB node, an F1 connection with a central unit of the IAB donor node; or
any combination thereof.

14. The method of claim 1, wherein establishing the signaling connection comprises:
establishing the signaling connection as a second signaling connection to support the sidelink communications for the first IAB node separate from a first signaling connection to support IAB functionality for the first IAB node.

15. The method of claim 14, further comprising:
transmitting an indication that the first signaling connection and the second signaling connection correspond to the first IAB node.

16. The method of claim 1, further comprising:
transmitting, to the IAB donor node via the signaling connection, a duplexing constraint associated with communications via the mobile termination unit, the distributed unit, and the sidelink connection for the first IAB node.

17. The method of claim 1, further comprising:
receiving, from a third IAB node, an indication that the third IAB node supports the sidelink communications; and
performing parent cell selection based at least in part on the indication received from the third IAB node.

18. The method of claim 1, further comprising:
receiving, based at least in part on transmitting the indication, at least one configuration for communicating one or more synchronization signal blocks (SSBs) to facilitate discovery of the first IAB node, one or more second IAB nodes, or one or more UEs; and
communicating the one or more SSBs based at least in part on the at least one configuration, wherein the sidelink connection is established based at least in part on communicating the one or more SSBs.

19. The method of claim 1, wherein:
the first IAB node includes one or more sidelink functions to support the sidelink communications; and
the one or more sidelink functions are separate from one or more distributed units of the first IAB node, one or more mobile termination units of the first IAB node, or both.

20. The method of claim 1, wherein:
the first IAB node includes one or more sidelink functions to support the sidelink communications; and
the one or more sidelink functions are collocated with one or more donor units, one or more mobile termination units, or both.

21. The method of claim 20, wherein the one or more sidelink functions are integrated with the one or more donor units, the one or more mobile termination units, or both.

22. A method for wireless communication at an integrated access and backhaul (IAB) donor node, comprising:
receiving, from a second IAB node, an indication that the second IAB node supports sidelink communications;
transmitting, to a core network and based at least in part on the received indication that the second IAB node supports the sidelink communications, a request for authorization for the second IAB node to perform the sidelink communications;
receiving, based at least in part on transmitting the request, an indication of the authorization to perform the sidelink communications; and
transmitting, to the second IAB node, a sidelink configuration that the second IAB node is to use to establish a sidelink connection with a third IAB node or a user equipment (UE).

23. The method of claim 22, wherein receiving the indication comprises:

receiving a sidelink capability message, wherein the sidelink capability message indicates that the second IAB node supports the sidelink communications in a control plane, that the second IAB node supports the sidelink communications in a user plane, an upper limit on a quantity of sidelink connections supportable by the second IAB node, or a combination thereof.

24. The method of claim 22, wherein transmitting the sidelink configuration comprises:
  transmitting, to the second IAB node, the sidelink configuration that indicates that the second IAB node is authorized to perform the sidelink communications in a control plane, that the second IAB node is authorized to perform the sidelink communications in a user plane, an upper limit on a quantity of sidelink connections that the second IAB node is authorized to establish, or a combination thereof.

25. The method of claim 22, further comprising:
  selecting a management entity at the core network based at least in part on receiving the indication.

26. An apparatus for wireless communication at a first integrated access and backhaul (IAB) node, comprising:
  one or more processors;
  one or more memories coupled with the one or more processors; and
  instructions stored in the one or more memories and executable by the one or more processors to cause the apparatus to:
    transmit, by the first IAB node on a signaling connection with an IAB donor node, a separate connection with the IAB donor node, or a separate connection with a network device separate from the IAB donor node, an indication that the first IAB node supports sidelink communications;
    establish, by the first IAB node and based at least in part on the transmitted indication that the first IAB node supports the sidelink communications, the signaling connection with the IAB donor node and a sidelink connection with a second IAB node or a user equipment (UE), wherein the first IAB node comprises a mobile termination unit and a distributed unit, and supports the sidelink communications;
    transmit a first one or more data messages to the IAB donor node via the established signaling connection; and
    transmit a second one or more data messages to the second IAB node or the UE via the established sidelink connection.

27. An apparatus for wireless communication at an integrated access and backhaul (IAB) donor node, comprising:
  one or more processors;
  one or more memories coupled with the one or more processors; and
  instructions stored in the one or more memories and executable by the one or more processors to cause the apparatus to:
    receive from a second IAB node, an indication that the second IAB node supports sidelink communications;
    transmit, to a core network and based at least in part on the received indication that the second IAB node supports the sidelink communications, a request for authorization for the second IAB node to perform the sidelink communications;
    receive, based at least in part on transmitting the request, an indication of the authorization to perform the sidelink communications; and
    transmit, to the second IAB node, a sidelink configuration that the second IAB node is to use to establish a sidelink connection with a third IAB node or a user equipment (UE).

28. The apparatus of claim 26, wherein the instructions are further executable by the one or more processors to cause the apparatus to:
  receive, from a core network, an indication that specifies that the first IAB node is authorized to perform the sidelink communications, wherein the sidelink connection is established based at least in part on the received indication.

29. The apparatus of claim 26, wherein the instructions are further executable by the one or more processors to cause the apparatus to:
  receive, from a central unit of the IAB donor node, a sidelink configuration that the first IAB node is to use to establish the sidelink connection with the second IAB node or the UE.

* * * * *